(12) United States Patent
Liu et al.

(10) Patent No.: US 12,303,843 B2
(45) Date of Patent: May 20, 2025

(54) FILTERING AND CONCENTRATING APPARATUS HAVING STIRRING FUNCTION

(71) Applicant: ZHEJIANG DONG'OU FILTERING MACHINERY MANUFACTURING CO., LTD., Lishui (CN)

(72) Inventors: Yiling Liu, Lishui (CN); Jinfu Chen, Lishui (CN); Liangfen Hu, Lishui (CN)

(73) Assignee: ZHEJIANG DONG'OU FILTERING MACHINERY MANUFACTURING CO., LTD., Lishui (CN)

( * ) Notice: Subject to any disclaimer, the term of this patent is extended or adjusted under 35 U.S.C. 154(b) by 758 days.

(21) Appl. No.: 17/612,007

(22) PCT Filed: May 22, 2020

(86) PCT No.: PCT/CN2020/091734
§ 371 (c)(1),
(2) Date: Nov. 17, 2021

(87) PCT Pub. No.: WO2020/238784
PCT Pub. Date: Dec. 3, 2020

(65) Prior Publication Data
US 2022/0212121 A1    Jul. 7, 2022

(30) Foreign Application Priority Data

May 24, 2019    (CN) .......................... 201910441806.7

(51) Int. Cl.
*B01D 9/00*    (2006.01)
*B01D 29/15*    (2006.01)
(Continued)

(52) U.S. Cl.
CPC .......... *B01D 9/005* (2013.01); *B01D 9/0063* (2013.01); *B01D 29/15* (2013.01); *B01D 29/52* (2013.01);
(Continued)

(58) Field of Classification Search
None
See application file for complete search history.

(56) References Cited

U.S. PATENT DOCUMENTS 2,791,333 A * 5/1957 McKay ................ B01D 9/0013
62/542
4,004,886 A * 1/1977 Thijssen .............. B01D 9/0036
62/541
(Continued)

FOREIGN PATENT DOCUMENTS

CN    101974031 A  *  2/2011
CN    101974031    * 12/2011 ................ C07F 9/38
(Continued)

*Primary Examiner* — Chester T Barry
(74) *Attorney, Agent, or Firm* — IPro, PLLC

(57) ABSTRACT

A filtering and concentrating apparatus having a stirring function for small ternary precursor particles, comprising a barrel (100). One end of the barrel (100) is provided with a first closure (101), and the other end of the barrel (100) is provided with a second closure (102). The barrel (100) or the first closure (101) or the second closure (102) is provided with a feed port (103). One or more discharge pipes (200) are provided on the inner wall of the barrel (100). Microporous filtering mediums (300) communicated with the interior of the discharge pipe (200) are provided on the discharge pipe (200). An end portion of the discharge pipe (200) is communicated with the exterior of the barrel (100). A stirring means (800) is provided inside the barrel (100).

13 Claims, 7 Drawing Sheets

(51) Int. Cl.
*B01D 29/52* (2006.01)
*B01D 29/60* (2006.01)
*B01D 29/66* (2006.01)
*B01D 29/86* (2006.01)
*B01D 35/18* (2006.01)

(52) U.S. Cl.
CPC ......... *B01D 29/601* (2013.01); *B01D 29/603* (2013.01); *B01D 29/66* (2013.01); *B01D 29/86* (2013.01); *B01D 35/18* (2013.01); *B01D 2009/0086* (2013.01); *B01D 2201/0484* (2013.01)

(56) References Cited

U.S. PATENT DOCUMENTS

| | | | | |
|---|---|---|---|---|
| 4,774,008 A | * | 9/1988 | Roodenrijs | B01D 29/86 210/791 |
| 5,175,355 A | * | 12/1992 | Streich | C07C 51/43 562/485 |
| 6,271,414 B1 | * | 8/2001 | Drope | C07C 263/20 560/336 |
| 2007/0045200 A1 | * | 3/2007 | Moon | B01D 29/66 210/767 |
| 2013/0213078 A1 | * | 8/2013 | Morimoto | F25B 40/02 62/324.6 |
| 2015/0096945 A1 | * | 4/2015 | Chen | B01D 33/21 210/330 |
| 2017/0003039 A1 | * | 1/2017 | Lazzari | F24F 1/0063 |

FOREIGN PATENT DOCUMENTS

| | | | | | |
|---|---|---|---|---|---|
| CN | 108465281 A | * | 8/2018 | ............ | B01D 29/50 |
| CN | 108465282 A | * | 8/2018 | ............ | B01D 29/52 |
| CN | 108479103 A | * | 9/2018 | ............ | B01D 9/005 |
| CN | 208320790 U | | 1/2019 | | |
| CN | 110102080 A | * | 8/2019 | ............ | B01D 29/15 |

* cited by examiner

FILTERING AND CONCENTRATING APPARATUS HAVING STIRRING FUNCTION

TECHNICAL FIELD

The present invention relates to the technical field of filtering and concentrating devices, and particularly relates to a filtering and concentrating apparatus having a stirring function for small ternary precursor particles, and a concentrating method.

BACKGROUND

It is well known that electrification of automobiles has become the general trend, and the lithium ion power battery with high energy storage has become the largest demand growth point in the battery industry. At present, power battery companies are mainly distributed in China, Japan and South Korea, and China has undoubtedly become the world's largest producer of lithium battery and its cathode material (the core material that determines the energy density of the lithium battery).

According to the difference of the cathode material, at present, the power batteries for automobiles are mainly divided into lithium iron phosphate batteries and ternary lithium batteries. The lithium iron phosphate batteries have good safety, and the ternary lithium batteries have high energy density. At present, the lithium iron phosphate batteries are mainly used for large vehicles of cars, and the ternary lithium batteries are mainly used for passenger cars and various special vehicles. Especially in recent years, the global traditional automobile enterprises have clearly developed to electrification, resulting in large increase in the demands for the ternary lithium batteries. Especially, high nickel ternary material has become the focus and production trend of the current cathode material industry.

The quality of the ternary cathode material (NCM Lithium nickel cobalt manganate/NCA Lithium nickel cobalt aluminate) determines the performance of the lithium battery, while the quality of the ternary precursor determines the quality of the ternary cathode material. Due to the increasing requirements from industry policies and downstream customers, manufacturers of upstream material also gradually put forward higher requirements for the performance of the production equipment. The enterprises have gradually realized the importance of intelligent production to improve the stability and consistency of product quality.

The morphology, particle size distribution, purity and tap density of the ternary precursor directly affect the performance of sintered ternary cathode material. The coprecipitation reaction of the material is the key technology for preparing the ternary precursor. Before the feed liquid is fed into the reactor for the coprecipitation reaction, it is necessary to increase the concentration of the feed liquid to ensure that the feed liquid in the reactor can grow crystals quickly in the process of the coprecipitation reaction to achieve high reaction rate. The current concentration technology adopts the baffle settlement mode, which makes the feed liquid crystallized in the baffle and then settled by limiting the overflow velocity of the feed liquid. The flow rate of feeding is controlled not to be high. Once the flow rate of feeding is too high, the feed liquid flows out of an overflow port before crystallizing and settling, resulting in the loss of the product and impossibility of increase of the controlled feeding capacity at the reactor. In this way, the overall reaction system cannot have high production efficiency.

Therefore, the existing concentrating apparatus has the problems of low solid particle content, no acceleration of flow rate of feeding, product loss, no increase of feeding capacity of the reactor, poor concentrating effect and low production efficiency.

SUMMARY

To solve the above technical problems in the existing concentrating apparatus, the present invention provides a filtering and concentrating apparatus having a stirring function for small ternary precursor particles, and a concentrating method. The present invention has the characteristics of high solid particle content, acceleration of feed flow rate, no product loss, increase of feeding capacity of a reactor, good concentrating effect and high production efficiency.

The technical solution of the present invention: a filtering and concentrating apparatus having a stirring function for small ternary precursor particles comprises a barrel, wherein one end of the barrel is provided with a first closure, and the other end of the barrel is provided with a second closure; the barrel or the first closure or the second closure is provided with a feed port; one or more discharge pipes are provided on the inner wall of the barrel; microporous filtering mediums communicated with the interior of the discharge pipe are provided on the discharge pipe; an end portion of the discharge pipe is communicated with the exterior of the barrel; and a stirring means is provided inside the barrel. In the present invention, one or more discharge pipes are provided on the inner wall of the barrel; the microporous filtering mediums communicated with the interior of the discharge pipe are provided on the discharge pipe; the microporous filtering mediums are used for filtering feed liquid; filtration accuracy is high, and the solid concentration of the feed liquid is increased. Under the action of filtration of the microporous filtering mediums, only the filtrate can pass through the microporous filtering mediums and then enter the discharge pipe, and is discharged. The required solid particles can remain in the barrel to participate in crystallization under the action of filtration of the microporous filtering mediums, without the phenomena of cross leakage or cross filtration or mixing. The solid particle material almost has no loss, and has the characteristic of good concentration effect. Since there is no problem of loss after the solid particles pass through the microporous filtering mediums, the molar content of metal salt in the feed liquid to be concentrated that enters the barrel can be increased, and the concentration of the feed liquid to be concentrated in the barrel can be increased. In this way, the whole technical process is shortened; the filtrate can be rapidly filtered and discharged; and the emission of the filtrate is reduced. In the practical production process, the emission of the filtrate can be reduced by 40% on the basis of the original emission of the filtrate, thereby reducing the processing cost of the filtrate and further reducing time and labor cost. The concentration of the solid particles in the reactor can be increased by 20%-200%; the reaction in the reactor is also accelerated, and the yield per unit time in the reactor is increased, so that the production is increased, the output is added and production cost is reduced. By increase of the concentration of the feed liquid to be concentrated that enters the barrel and high-accuracy filtration of the microporous filtering mediums, the direct yield of the product in the reactor can be increased to 98%. Since the thickened pulp of the solid particles left after the feed liquid passes through the microporous filtering mediums can settle quickly and can be conveyed into the reactor from the barrel in time for coprecipitation and crystal growth, the whole reaction period becomes short. In the specific production process, the reaction period can be shortened by 15% on the basis of the original reaction period. The staying time of the solid particles in the barrel is also approximately the same. Thus, the crystal sizes of the solid particles in the barrel have little difference. Meanwhile, in the settling process of the solid particles, due to the large concentration of the solid particles in the barrel, friction will occur when the solid particles settle together. In the process of mutual friction, the sharp parts on the surfaces of the solid particles can be removed so that the surfaces of the solid particles are round and then the solid particles that enter the reactor from the barrel have uniform sizes. Particle sizes have little difference, and the product grain morphology formed after the thickened pulp of the solid particles grow crystals in the reactor is improved and is more beautiful. The arrangement of the stirring means enables a filter cake falling from the filtering pipe to the barrel after recoil or blowback to be broken up in time after falling under the disturbance of stirring to return to the reactor to participate in crystallization, thereby ensuring that the solid entering the reactor can have uniform particle size.

Preferably, the discharge pipe is composed of one or more annular pipes, the annular pipe is provided with a plurality of mounting holes on the top or bottom, and the microporous filtering mediums are arranged at the mounting holes. The discharge pipe is arranged in the structure of the annular pipe, so that the filtrate is better discharged and the inner discharge resistance of the discharge pipe to the filtrate is reduced. One, two, three or more annular pipes can be arranged, and each annular pipe is provided with a plurality of mounting holes on the top or bottom at equal interval. In this way, a plurality of microporous filtering mediums can be arranged at the mounting holes of the discharge pipe according to actual needs for the convenience of better filtering and concentrating the feed liquid in the barrel. The mounting holes can be replaced with joints for connecting and installing the microporous filtering mediums through threads or tightening.

Preferably, the microporous filtering mediums are filtering pipes; the filtering pipes are arranged on the top of the annular pipe, or the filtering pipes are arranged on the bottom of the annular pipe, or the filtering pipes are arranged on the top and the bottom of the annular pipe crisscross. The filtration aperture of a plurality of filtering holes on the filtering pipe is 0.1-1 μm for ensuring that the filtrate is clear without cross leakage when a small particle product is filtered. The filtering pipe can be installed on the annular pipe according to the need, can also be installed on the annular pipe upside down, and can also be installed on the annular pipe alternately upside and upside down, with many options. The user can flexibly select the arrangement mode of the filtering pipes on the annular pipe according to the actual filtration needs.

Preferably, the plurality of annular pipes are concentrically arranged, and adjacent annular pipes are communicated; The plurality of annular pipes are concentrically arranged. Thus, firstly, the annular pipes can be arranged inside the barrel in parallel with the feed liquid; secondly, the filter cake on the surface of the filtering pipe can conveniently fall and the thickened pulp near the region of the filtering pipe can return to form more uniform pulp; and thirdly, an orderly installation position can be provided for the filtering pipe, so that the filtering pipes can be arranged tidily after installed on the discharge pipe so as to better filter the feed liquid. One, two or more second interfaces of the feed liquid can be arranged on the annular pipe, which can be flexibly arranged according to needs.

Preferably, the annular pipes are circular pipes or regular hexagonal pipes. The annular pipes formed by the circular pipes or the regular hexagonal pipes are convenient for processing and manufacturing, and have smaller resistance to the filtrate. Of course, the annular pipes can also be configured as other regular polygons or other polygons.

Preferably, the filtering pipes are made of ultra-high molecular weight polyethylene material, or made of filter cloth, or made of ceramic, or made of tetrafluoride material, or made of titanium powder, or made of titanium mesh, or made of metal powder, or made of metal mesh. The filtering pipes are made of the ultra-high molecular weight polyethylene material, so that the filtering pipes have good abrasion resistance, impact resistance and thermal stability, and may not produce chemical reaction with the material. The filtering pipes may not be easily damaged even after filtration in the barrel for a long time.

Preferably, a gap between adjacent filtering pipes on the same annular pipe is 5-100 mm. A more preferred gap is 10-80 mm. The most preferred gap is 15-50 mm. The specific design of the gap between the adjacent filtering pipes is used for better filtering the feed liquid by the filtering pipe. After the solid particles are adhered to the filtering pipe, the solid particles can fall from the filtering pipe into the barrel quickly without the interference of the adjacent filtering pipe, for continuing the crystallization. The gap between the filtering pipes can also be designed by setting a distance between adjacent mounting holes.

Preferably, the ratio range of the length to the outside diameter of the filtering pipe is [10,50]. More preferably, the ratio range of the length to the outside diameter of the filtering pipe is [15,40]. Thus, the length and the outside diameter of the filtering pipe coordinate to better remove the filter cake.

Preferably, a plurality of filtering pipes on the same annular pipe are connected together by a clamp strip and/or a clamp hoop. The filtrate has a certain impact on the filtering pipe when passing through the filtering pipe in the process that the feed liquid is filtered by the filtering pipe, and the whole filtering pipe is flexible. Therefore, the arrangement of the clamp strip can connect all the filtering pipes on the same annular pipe in series into a whole. Since the clamp strip has certain strength and may not be affected by the impact of the filtrate, the arrangement of all clamping pieces can effectively prevent the filtering pipes from swinging under the action of stirring, filtration, recoil and blowback, thereby avoiding the problem of leakage at the joints between the filtering pipes and the discharge pipe. More preferably, one clamp hoop can be used for fixing a plurality of filtering pipes on the same annular pipe so that a plurality of filtering pipes on the same annular pipe are connected more stably, wherein clamp strips and clamp hoops can be respectively arranged on the filtering pipes near both ends.

Preferably, supporting pipes are arranged inside the filtering pipes; the filtering pipes are arranged on the supporting pipes; and one end of each supporting pipe is arranged on the discharge pipe. The supporting pipes can better prevent the filtering pipes from swinging, so that the filtering pipes always carry out filtration work in the vertical direction, which can ensure the working stability of the filtering pipes. The supporting pipes can be solid rods or hollow pipes. When the supporting pipes are the pipes, circulation holes and/or circulation grooves can be formed on the surfaces.

Preferably, the supporting pipes are provided with a plurality of circulation holes or circulation grooves. The circulation holes or the circulation grooves are convenient for entering the supporting pipes and discharging from the discharge pipe after the filtrate passes through the filtering holes on the filtering pipes, thereby further providing a mode of entering the discharge pipe by the filtrate. The filtrate directly enters the discharge pipe for discharge after passing through the filtering holes. The filtrate can also be connected to the supporting pipes and then discharged from the discharge pipe after passing through the circulation holes or the circulation grooves. The filtrate can also enter the discharge pipe for discharge through the above two modes.

Preferably, one, two or three discharge pipes are provided, and the two or three discharge pipes are arranged on the inner wall of the barrel in parallel along the vertical direction. The quantity of the discharge pipes can be selected for installation according to the actual need of the user, and can be one, two, three or more. The positions of the discharge pipes inside the barrel can be flexibly set, as long as a better installation and filtration effect can be achieved for the filtering pipes and the practical requirements of filtration amount are satisfied. Of course, preferably, two or three discharge pipes are arranged.

Preferably, a liquid outlet valve is arranged on a pipeline connected with the end portion of the discharge pipe; the liquid outlet valve is connected with a filtrate outlet pipe; and the filtrate outlet pipe is provided with a first regulating valve. The filtrate outlet pipe has the main effect of controlling the communication or barrier between the filtrate outlet pipe and the interior of the barrel. In the practical operation process, the liquid outlet valve is fully opened or fully closed. The first regulating valve has the main effect of regulating and controlling the flow of the discharged filtrate in the filtrate outlet pipe as required to cooperate with other valves to maintain the filtration and flowing stability of the whole feed liquid in the barrel, to ensure that the feed liquid in the barrel achieves a more efficient filtration and concentrating effect at the best flow rate.

Preferably, the pipeline connected with the end portion of the discharge pipe is provided with a recoil valve and/or a blowback valve; the recoil valve is connected with a filtrate inlet pipe and/or a deionized water inlet pipe; and the blowback valve is connected with a nitrogen inlet pipe. The recoil valve has an effect of controlling whether the filtrate or deionized water is introduced into the discharge pipe as required, so as to remove the filter cake formed on the surface of the filtering pipe in time. The blowback valve has an effect of controlling whether nitrogen is introduced into the discharge pipe as required, so as to purge the interior of the pipeline. Since more solid particle materials block the filtering holes of the filtering pipes after the filtering pipes work for a period of time, the recoil valve or the blowback valve needs to be used for recoil or blowback for the discharge pipe. The first purpose is to blow away the solid particle materials at the filtering holes from the filtering holes in time, so that the filtering pipes maintain a good filtration effect; and the second purpose is to enable the solid particles on the filtering pipes to return to the reactor in time to participate in crystallization and enable the solid particles on the filtering pipes to return to the barrel in time to participate in crystallization.

Preferably, a remote turbidimeter is arranged on the position of the filtrate outlet pipe near the liquid outlet valve, and the filtrate outlet pipe between the remote turbidimeter and the first regulating valve is provided with a remote filtrate flowmeter. The remote turbidimeter has an effect of inspecting the content of the solid particles in the filtrate in time, so that operators can understand the state of the filtering pipes. If the content of the solid particles in the filtrate exceeds the standard through detection by the remote turbidimeter, it is convenient for the operators to check the reason in time, so as to ensure that there is no problem of cross leakage or cross filtration or mixing of the required solid particles from the filtering pipes. The remote filtrate flowmeter has an effect of detecting the flow of the filtrate discharged from the filtrate outlet pipe in real time, to understand the filtration and concentration rate in the barrel in time, to ensure high efficiency of the whole filtration and concentration.

Preferably, the filtrate outlet pipe between the remote turbidimeter and the remote filtrate flowmeter is provided with an initial filtrate return valve, and the initial filtrate return valve is connected with a reactor through a pipeline. Since the solid particles in the feed liquid which enters the barrel are the initial products at a period of time at the beginning of the filtration and concentration, the crystal nucleus particles of the solid particles are just generated, and the particle size will be less than 0.1 micron. At this time, the solid can pass through the filtering holes of the filtering pipes and is discharged with the filtrate. Thus, the filtrate contains the required solid particles during this period of time. Therefore, it is necessary to completely close the first regulating valve and open the initial filtrate return valve in this period of time so that the filtrate containing small solid particles in this period of time return to the reactor for growing crystals, until the small solid particles become large. This period of time should last about 3-100 min. Data from the remote turbidimeter shows that after the amount of the small solid particles in the filtrate reaches an appropriate value, the initial filtrate return valve is closed, the first regulating valve is opened and the opening is adjusted to carry out the normal filtration and concentration work.

Preferably, the filtrate outlet pipe between the remote turbidimeter and the remote filtrate flowmeter is provided with a first regenerated material valve; and the first regenerated material valve is connected with a regeneration tank through the pipeline. After the filtering and concentrating apparatus is used for a long time and after recoil or blowback, the solid particles always remain inside the barrel and in some corners between the filtering pipes and the discharge pipes; and many solid particles are consolidated inside the filtrate outlet pipe and other pipelines or even the barrel. The solid particles can affect the uniformity of the particles in the product batch and should be cleaned with sulfuric acid, preferably dilute sulfuric acid. The solid particle blocks in the filtrate outlet pipe and other pipelines are dissolved to ensure the discharge velocity of the filtrate in the filtrate outlet pipe and ensure the efficient and stable filtration and concentration work. The regeneration tank is filled with the sulfuric acid for dissolving the solid particle blocks in the pipeline, and the first regenerated material valve is used to control the communication between the regeneration tank and the interior of the concentrating apparatus.

Preferably, an insulation layer is arranged outside the barrel. According to the requirements of the process, the device body material should be heated to required temperature before each batch of feeding, to avoid causing material temperature change and affecting product quality when the material enters the filtering and concentrating apparatus. The insulation layer can prevent the temperature loss of the feed liquid in the barrel, so that the reaction of the feed liquid in the barrel is always maintained in a relatively stable temperature range, such as 60-70° C.

Preferably, the insulation layer is a jacket or insulation cotton. The jacket can be arranged directly using the mechanism of electric heating or heat conduction. Distilled water or other heating liquid is added into the jacket. The device is directly preheated by heating the distilled water or heating liquid inside the jacket, so as to directly satisfy the process requirements. The jacket can be replaced with the insulation cotton, but hot air or hot water needs to be used prior to feeding to preheat the device. Feeding is conducted when the temperature of the device satisfies the process requirements, and the insulation cotton is used to maintain a relatively constant temperature of the device.

Preferably, the jacket is provided with a first interface and a second interface; and the jacket is connected with a constant temperature heating device. The first interface is used for the distilled water or other heating liquid to enter the jacket, and the second interface is used for discharging the distilled water or other heating liquid out of the jacket. The constant temperature heating device is used for constant temperature heating of the distilled water or other heating liquid in the jacket to ensure that the device is always in the temperature range required by the process. The constant temperature heating device is a constant temperature heating rod or other existing constant temperature heaters.

Preferably, the first closure is connected with a remote level gauge and a remote pressure transmitter. The remote level gauge is used for detecting the liquid level height of the feed liquid in the barrel in real time, and the remote pressure transmitter is used for detecting the air pressure in the barrel in real time, which is convenient for the understanding of the operators and specific regulation and control. PLC programs are used for running automatically.

Preferably, the first closure is connected with a spray apparatus; the spray apparatus is located inside the barrel; the spray apparatus is respectively connected with a first regenerated liquid pipe and a first deionized water pipe; the first regenerated liquid pipe is provided with a first regenerated liquid valve; and the first deionized water pipe is provided with a first deionized water valve. The spray apparatus is used to wash the device after a reaction is completed or after the filtering and concentrating apparatus is used for a period of time. When too many solid particle blocks are deposited inside the barrel or the pipelines, the first regenerated liquid valve can be opened to inject dilute sulfuric acid into the barrel for dissolving the solid particle blocks inside the barrel or the pipelines. After dissolution, the dilute sulfuric acid is discharged, and then the first deionized water valve is opened. The deionized water is used to thoroughly rinse the interior of the barrel and the relevant pipelines to ensure that the device is always in a good filtration and concentration state. Or, after a filtration and concentration job is completed ordinarily, it is found that no solid particle block is deposited inside the barrel. At this moment, there is no need to spray the dilute sulfuric acid into the barrel, and the first deionized water valve is opened only to spray deionized water into the barrel for washing.

Preferably, the spray apparatus is a spray ball or a spray discharge pipe. The spray apparatus adopts the spray ball or the spray discharge pipe, which can be flexibly selected according to the preference of the user. The spray ball and the spray discharge pipe have the characteristics of simple structure, low price and good spray effect.

Preferably, the first closure is provided with a first technical connecting pipe; the first technical connecting pipe is respectively connected with an air intake pipe and an air relief pipe; the air intake pipe is provided with an air intake valve; and the air relief pipe is provided with an air relief valve. The coordinate regulation of the air intake valve and the air relief valve can ensure that the feed liquid is always at a stable liquid level height in the barrel. When the remote level gauge shows that the liquid level is too high, the air intake valve is opened and nitrogen is introduced into the barrel so that the liquid level of the feed liquid in the barrel is reduced to a desired height. When the remote level gauge shows that the liquid level is too low, the air relief valve is opened and gas in the barrel is discharged so that the liquid level of the feed liquid in the barrel is increased to the desired height. The best height of the liquid level in the barrel is not higher than the height of the microporous filtering mediums.

Preferably, a second technical connecting pipe is arranged at the position on the barrel near the first closure; the second technical connecting pipe is provided with an overflow valve; and the second technical connecting pipe is connected with the reactor. When the flow of the feed liquid entering the barrel is too large so that the liquid level of the feed liquid in the barrel is too high, the overflow valve can be opened to enable redundant feed liquid in the barrel to return to the reactor to ensure that the feed liquid in the barrel is not too full.

Preferably, the stirring means comprises a stirring shaft; the stirring shaft is provided with one layer, two layers, three layers or four layers of stirring paddles; the lengths of the two layers, three layers or four layers of stirring paddles are the same; or the lengths of the two layers, three layers or four layers of stirring paddles are decreased from the direction of the second closure to the first closure. The layers of the stirring paddles and the lengths of the stirring paddles can be flexibly adjusted according to the characteristics of the material as required, so that the filter cake falling from the filtering pipe can be better broken up. The layers of the stirring paddles are preferably two layers or three layers, and the lengths of the three layers of stirring paddles are preferably decreased from the direction of the second closure to the first closure.

Preferably, two discharge pipes are a first discharge pipe and a second discharge pipe respectively; the microporous filtering medium at the first discharge pipe is a first microporous filtering medium, and the microporous filtering medium at the second discharge pipe is a second microporous filtering medium; and the three layers of stirring paddles are respectively located above the first microporous filtering medium, above the second microporous filtering medium and below the second microporous filtering medium. Two discharge pipes are designed. The microporous filtering mediums are correspondingly arranged on the two discharge pipes so that when two or more microporous filtering mediums are designed and during recoil or blowback, the filtrate still can be filtered, to ensure the continuity of the flow of the filtrate. Compared with one microporous filtering medium, a better filtration effect is achieved and filtration speed can be higher. The setting of the relative positions between the three layers of the stirring paddles and the microporous filtering mediums can especially stir and disturb the feed liquid at the microporous filtering mediums. After the filter cake on the microporous filtering medium falls, the filter cake can be broken up in time to return to the reactor to participate in crystallization under the action of stirring and disturbance. In case of two layers of the stirring paddles, the two layers of the stirring paddles are preferably located above the second microporous filtering medium and below the second microporous filtering medium.

Preferably, the length ratio of the three layers of the stirring paddles from the direction of the second closure to the first closure is 5:4:3. The length ratio of the three layers of the stirring paddles is especially designed according to the downward settling direction of the falling filter cake. The disturbance amplitude of the three layers of the stirring paddles to the feed liquid is gradually decreased from the direction of the second closure to the first closure, which conforms to the attribute requirements that the filter cake settles from top to bottom and the disturbance and breaking strength is increased gradually. The filter cake which is not broken up by the upper layer of the stirring paddle in the settling process from top to bottom may be broken up by the lower layer of the stirring paddle with larger strength in the declining process, thereby ensuring that the filter cake settling to the lower part of the barrel is completely broken up and ensuring that the crystal nuclei of the solid particles entering the reactor are dispersed. Meanwhile, the stirring action can also promote the friction between the solid particles in the feed liquid, making the surfaces of the solid particles more round and improving the morphology of the crystal nuclei. The range of the length ratio of the three layers of the stirring paddles is (6-2):(5-2):(4-1).

Preferably, a support is arranged outside the jacket or on the barrel or on the first closure or the second closure, and the support is provided with a lifting lug. The support is used for installation of the barrel so that the top and the bottom of the barrel are simultaneously hung in the air for conducting other technological operation, thereby overcoming the installation mode that the existing barrel can only be flatwise placed on the ground. The lifting lug is used for lifting and declining the barrel during installation of the barrel. The existing device is on the ground.

Preferably, the second closure is of a V-shaped structure, or spherical crown structure, or ellipsoidal structure, or flat bottom structure; and the first closure is of ellipsoidal structure. The spherical crown structure is the best. The second closure of the spherical crown structure can ensure that the feed liquid in the barrel is quickly discharged without residues when the feed liquid needs to be emptied.

Preferably, the barrel or the second closure is provided with a third technical connecting pipe; the third technical connecting pipe is provided with a second regulating valve; and the third technical connecting pipe is connected with the reactor. The second regulating valve is used for regulating the flow rate of entering the reactor by the remaining thickened pulp of the solid particles after filtration and concentration in the barrel. The first regulating valve, the second regulating valve and the diaphragm pump conduct coordinate regulation through mutual degrees of opening, so that the feed liquid in the barrel is always at the stable liquid level height. The feed liquid in the barrel is always in a circulating operating state. Through the coordinate regulation of the first regulating valve, the second regulating valve and the diaphragm pump by mutual degrees of opening, the flow rate of feeding can be accelerated appropriately as required and the feeding capacity in the reactor can be increased, so that the whole reaction system can achieve high production efficiency.

Preferably, a feed pipe is connected at the feed port; a pneumatic ball valve is arranged at the position on the feed pipe near the feed port; and the pneumatic ball valve is connected with a remote feed flowmeter, a damper, a check valve, a hose, a diaphragm pump and a feed valve successively. The pneumatic ball valve can be used to remotely control the opening and closing of feeding in the barrel. The remote feed flowmeter can detect the flow rate of the feed liquid entering the barrel in real time and specifically regulate the flow rate and the feeding capacity of the feed liquid entering the barrel reasonably. The damper is used for reducing the impact vibration intensity of the feed liquid that enters the pipeline, so that the remote feed flowmeter can detect the flow rate of feeding in the pipeline more stably. The check valve can prevent the feed liquid from flowing back and damaging the diaphragm pump. The hose can reduce the influence of the vibration of the diaphragm pump on the pipeline. The diaphragm pump provides power for the flow of the feed liquid, and the diaphragm pump also has the function of adjusting the flow rate of the feed liquid. The feed valve can control the opening and closing of the circulating flow of the feed liquid in the reactor towards the feed pipe of the barrel.

Preferably, the feed pipe is connected with the reactor through the pipeline; and the pipeline between the feed pipe and the reactor is provided with a thickened pulp return valve. When the filtering and concentrating apparatus stops working, the feeding for the barrel has stopped, and the thickened pulp feed liquid that does not return to the reactor from the second regulating valve in the barrel needs to be discharged. At this moment, only the thickened pulp return valve needs to be opened to thoroughly discharge all the thickened pulp feed liquid in the barrel into the reactor. The reactor can be a secondary reactor such as an intermediate tank.

Preferably, the feed pipe is connected with the regeneration tank through the pipeline; and the pipeline between the feed pipe and the regeneration tank is provided with a second regenerated material valve. After the filtering and concentrating apparatus is used for a long time, many solid particle blocks are consolidated inside the feed pipe and related pipelines. The remaining solid particles can affect the uniformity of the particle sizes in a next batch of products and the solid particle blocks can affect the flow rate of feeding in the pipelines in normal filtration and concentration work. At this moment, the solid particles should be cleaned with sulfuric acid, preferably dilute sulfuric acid. The solid particle blocks in the feed pipe and relevant pipelines are dissolved to ensure the entering velocity of the feed liquid in the feed pipe and ensure the efficient and stable filtration and concentration work. The regeneration tank is filled with the sulfuric acid for dissolving the solid particle blocks in the pipeline, and the second regenerated material valve is used to control the communication between the regeneration tank and the feed pipe and relevant pipelines.

Preferably, the pipeline between the pneumatic ball valve and the remote feed flowmeter is provided with a third regulating valve. The size of the feed flow can also be adjusted by adjusting the opening of the third regulating valve. The third regulating valve can be used in conjunction with the diaphragm pump to control the size of the feed flow, or only the diaphragm pump is used to control the size of the feed flow. For some diaphragm pumps without the feed flow regulation function, there is no need to install the third regulating valve which is used to control the size of the feed flow.

Preferably, the pipeline between the diaphragm pump and the feed valve is provided with a second regenerated liquid pipe and a second deionized water pipe in parallel; the second regenerated liquid pipe is provided with a second regenerated liquid valve; and the second deionized water pipe is provided with a second deionized water valve. After the second regenerated liquid valve is opened, dilute sulfuric acid can be introduced into the corresponding pipeline to dissolve the solid particle blocks in the relevant pipeline. When the solid particle blocks in the corresponding pipeline are dissolved, the dilute sulfuric acid is discharged, and then the second deionized water valve is opened. The deionized water is used to thoroughly rinse the interior of the corresponding pipeline to ensure that the corresponding pipeline is always in a good liquid circulation state. Or, after a filtration and concentration job is completed ordinarily, it is found that no solid particle block is deposited inside the corresponding pipeline. At this moment, there is no need to spray the dilute sulfuric acid into the barrel, and the second deionized water valve is opened only to introduce the deionized water into the corresponding pipeline for washing. The pipeline, the diaphragm pump and the valve are rinsed to prevent the pipeline from being blocked.

Preferably, the pipeline between the pneumatic ball valve and the reactor is provided with a first sight glass, and a second sight glass is arranged on the position of the filtrate outlet pipe near the remote turbidimeter. The first sight glass and the second sight glass can be used to observe the liquid flow in the corresponding pipeline, and the operators can intuitively understand the feed liquid circulation inside the corresponding pipeline.

Preferably, the pressure of nitrogen in the nitrogen inlet pipe is 0.55-0.65 MPa. The specific setting of nitrogen pressure in the nitrogen inlet pipe can produce a good blowback effect at the filtering pipe. The pressure of the nitrogen introduced into the nitrogen inlet pipe is sufficient to blow down the filter cake at the filtering hole in the filtering pipe to fall into the barrel. When the blowback pressure is low, the same purpose of removing the filter cake can be achieved by extending the opening time of the blowback valve, and the energy of the filtering pipe is restored.

Preferably, the stirring speed of the stirring means is 30-300 rpm. More preferably, the stirring speed is 50-200 rpm. Most preferably, the stirring speed is 60-150 rpm. The specific stirring speed can be flexibly designed according to the properties of the material, in order to achieve good disturbance and breaking of the filter cake.

Preferably, the barrel, the upper closure and the lower closure are of an integral structure or separated structure. For the integral structure, processing and manufacturing are convenient; manufacturing cost is reduced; and good strength is obtained. For the separated structure, maintenance and installation are convenient and internal cleaning of the barrel is also convenient.

Another technical solution of the present invention: a concentrating method of the filtering and concentrating apparatus having the stirring function for small ternary precursor particles is carried out according to the following steps:

S02: opening the air relief valve to vent the interior of the barrel;

S03: after the interior of the barrel is vented, opening the feed valve, the pneumatic ball valve, the liquid outlet valve, the first regulating valve and the second regulating valve;

S04: after all the valves in step S03 are opened, starting the diaphragm pump, conveying liquid to be concentrated into the barrel, and filtering the liquid to be concentrated through the microporous filtering mediums;

S05: detecting a liquid level in the barrel in real time, and closing the air relief valve when the liquid level of the concentrate in the barrel reaches an appropriate height;

S06: after closing the air relief valve, regulating the opening degrees of the diaphragm pump, the first regulating valve and the second regulating valve so that the height of the liquid level in the barrel is stable;

S07: after the height of the liquid level in the barrel is maintained for a certain time, closing the liquid outlet valve and opening the recoil valve or the blowback valve;

S08: after the recoil valve or the blowback valve is opened for a certain time, closing the recoil valve or the blowback valve and reopening the liquid outlet valve;

S09: detecting the liquid level in the barrel in real time, opening and closing the air relief valve again, maintaining the height of the liquid level in the barrel stable again, and circulating to step S07.

Preferably, before step S02, the method also comprises step S01, power-on self-test of the system.

Preferably, after step S09, the method also comprises step S10, repeating step S09 until a product detected in the reactor is qualified.

Preferably, after step S10, the method also comprises S11, closing the diaphragm pump, discharging the feed liquid in the barrel, washing the apparatus, and closing all the valves for standby in sequence.

Preferably, when the liquid level height of the concentrate in step S05 exceeds the microporous filtering medium, the height is appropriate. In this way, the full use of the microporous filtering medium can give full play to the filtration effect of the microporous filtering medium, with high filtration efficiency and large flow.

Preferably, in the step S07, the time of maintaining the liquid level height in the barrel is 5-200 min. More preferably, in the step S07, the time of maintaining the liquid level height in the barrel is 10-100 min. Most preferably, in the step S07, the time of maintaining the liquid level height in the barrel is 30-700 min. The thickness of the filter cake on the filtering pipe is qualitatively judged by specific time, and then the time when the filter cake on the filtering pipe should be recoiled or blown back is determined. The judgment is relatively accurate.

Preferably, in the step S08, the time of opening the recoil valve is 3-300 S; and the time of opening the blowback valve is 2-100 S. More preferably, in the step S08, the time of opening the recoil valve is 5-60 S; and the time of opening the blowback valve is 3-20 S. Most preferably, in the step S08, the time of opening the recoil valve is 8-20 S; and the time of opening the blowback valve is 4-10 S. Specific time is used to judge whether recoil or blowback on the filter cake on the filtering pipe is complete, and the judgment is relatively accurate.

Preferably, in the step S03, before the first regulating valve is opened, the initial filtrate return valve is opened for a certain time.

Preferably, the opening time of the initial filtrate return valve is 3-100 min. More preferably, the opening time of the initial filtrate return valve is 5-15 min. Specific time is used to judge whether the small solid particles that initially enter the barrel become large, and the judgment is relatively accurate.

Preferably, the flow rate in the pipeline at the first regulating valve and/or the second regulating valve in step S06 is 10 L/h-10000 L/h. More preferably, the flow rate in the pipeline at the first regulating valve and/or the second regulating valve in step S06 is 50 L/h-6000 L/h. Most preferably, the flow rate in the pipeline at the first regulating valve and/or the second regulating valve in step S06 is 300 L/h-5000 L/h.

Preferably, the flows in the whole reaction process satisfy the following formulas:

formula 1: the total flow of reaction in the reactor=the flow of a finished product after deaging in the reactor+ the flow of the filtrate in the filtering and concentrating apparatus;

formula 2: the feed flow of the diaphragm pump=the flow through the second regulating valve+the flow of the filtrate in the filtering and concentrating apparatus.

Preferably, the flows in the whole reaction process satisfy the following formulas:

formula 3: the feed flow of diaphragm pump=2-20 times of filtrate flow in the filtering and concentrating apparatus.

The present invention has the following beneficial effects:

One or more discharge pipes are provided on the inner wall of the barrel; the microporous filtering mediums communicated with the interior of the discharge pipe are provided on the discharge pipe; the microporous filtering mediums are used for filtering feed liquid; filtration accuracy is high, and the concentration of the feed liquid is increased. Under the action of filtration of the microporous filtering mediums, only the filtrate can pass through the microporous filtering mediums and then enter the discharge pipe, and is discharged. The required solid particles can remain in the barrel under the action of filtration of the microporous filtering mediums, and return to the reactor in time for growing crystals without the phenomena of cross leakage or cross filtration or mixing. The solid particle material almost has no loss, and has the characteristic of good concentration effect.

(2) Since there is no problem of loss after the solid particles pass through the microporous filtering mediums, the molar content of metal salt in the feed liquid to be concentrated that enters the barrel can be increased, and the concentration of the feed liquid to be concentrated in the barrel can be increased. In this way, the whole technical process is shortened; the filtrate can be rapidly filtered and discharged; and the emission of the filtrate is reduced. In the practical production process, the emission of the filtrate can be reduced by 40% on the basis of the original emission of the filtrate, thereby reducing the processing cost of the filtrate and further reducing time and labor cost. The concentration of the solid particles in the reactor can be increased by 20%-200%; the reaction in the reactor is also accelerated, and the yield per unit time in the reactor is increased, so that the production is increased, the output is added and production cost is reduced. By increase of the concentration of the feed liquid to be concentrated that enters the barrel and high-accuracy filtration of the microporous filtering mediums, the direct yield of the product in the reactor can be increased to 98%.

(3) Since the thickened pulp of the solid particles left after the feed liquid passes through the microporous filtering mediums can settle quickly and can be conveyed into the reactor from the barrel in time for co-precipitation and crystal growth, the whole reaction period becomes short. In the specific production process, the reaction period can be shortened by 15% on the basis of the original reaction period. The staying time of the solid particles in the barrel is also approximately the same. Thus, the crystal sizes of the solid particles in the barrel have little difference. Meanwhile, in the settling process of the solid particles, due to the large concentration of the solid particles in the barrel, friction will occur when the solid particles settle together. In the process of mutual friction, the sharp parts on the surfaces of the solid particles can be removed so that the surfaces of the solid particles are round and then the solid particles that enter the reactor from the barrel have uniform sizes. Particle sizes have little difference, and the product grain morphology formed after the thickened pulp of the solid particles grows crystals in the reactor is improved and is more beautiful.

(4) The arrangement of the stirring means enables a filter cake falling from the filtering pipe to the barrel after recoil or blowback to be broken up in time after falling under the disturbance of stirring to return to the reactor to participate in crystallization, thereby ensuring that the solid entering the reactor can have uniform particle size.

Reference signs: 100—barrel; 101—first closure; 102—second closure; 103—feed port; 104—remote level gauge; 105—remote pressure transmitter; 106—first technical connecting pipe; 107—air intake pipe; 108—air relief pipe; 109—air intake valve; 110—air relief valve; 111—second technical connecting pipe; 112—overflow valve; 113—support; 114—lifting lug; 115—third technical connecting pipe; 116—second regulating valve; 200—discharge pipe; 201—mounting hole; 202—liquid outlet valve; 203—filtrate outlet pipe; 204—recoil valve; 205—blowback valve; 206—filtrate inlet pipe; 207—deionized water inlet pipe; 208—nitrogen inlet pipe; 209—remote turbidimeter; 210—remote filtrate flowmeter; 211—initial filtrate return valve; 212—first regenerated material valve; 213—first discharge pipe; 214—second discharge pipe; 215—first microporous filtering medium; 216—second microporous filtering medium; 217—second sight glass; 218—first regulating valve; 300—microporous filtering medium; 301—champ strip; 302—supporting pipe; 303—clamp hoop; 304—circulation hole; 400—reactor; 500—regeneration tank; 600—insulation layer; 601—first interface; 602—second interface; 603—constant temperature heating device; 604—first interface valve; 700—spray apparatus; 701—first regenerated liquid pipe; 702—first deionized water pipe; 703—first regenerated liquid valve; 704—first deionized water valve; 800—stirring means; 801—stirring shaft; 802—stirring paddle; 900—feed pipe; 901—pneumatic ball valve; 902—remote feed flowmeter; 903—damper; 904—check valve; 905—hose; 906—diaphragm pump; 907—feed valve; 908—thickened pulp return valve; 909—second regenerated material valve; 910—third regulating valve; 911—second regenerated liquid pipe; 912—second deionized water pipe; 913—second regenerated liquid valve; 914—second deionized water valve; 915—first sight glass.

DETAILED DESCRIPTION

The present invention will be further described below in combination with the drawings and the embodiments, and the following embodiments are not the basis of limitation to the present invention.

Figure 1:
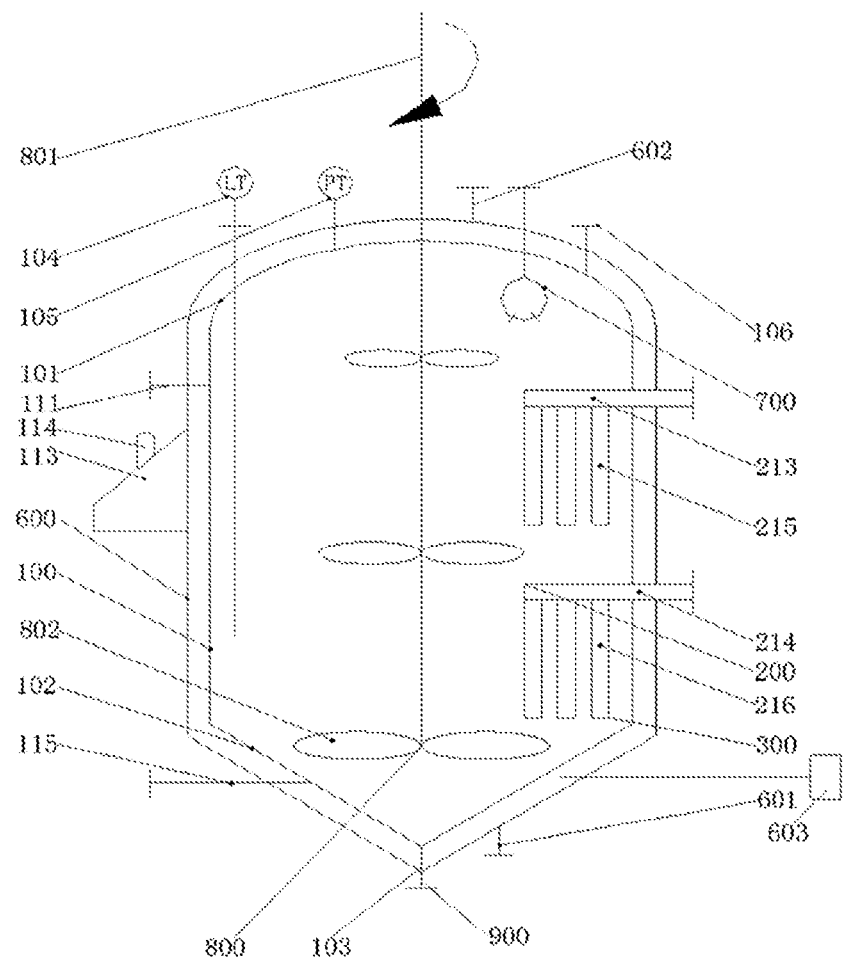
FIG. 1 is a structural schematic diagram of the present invention.
Figure 2:
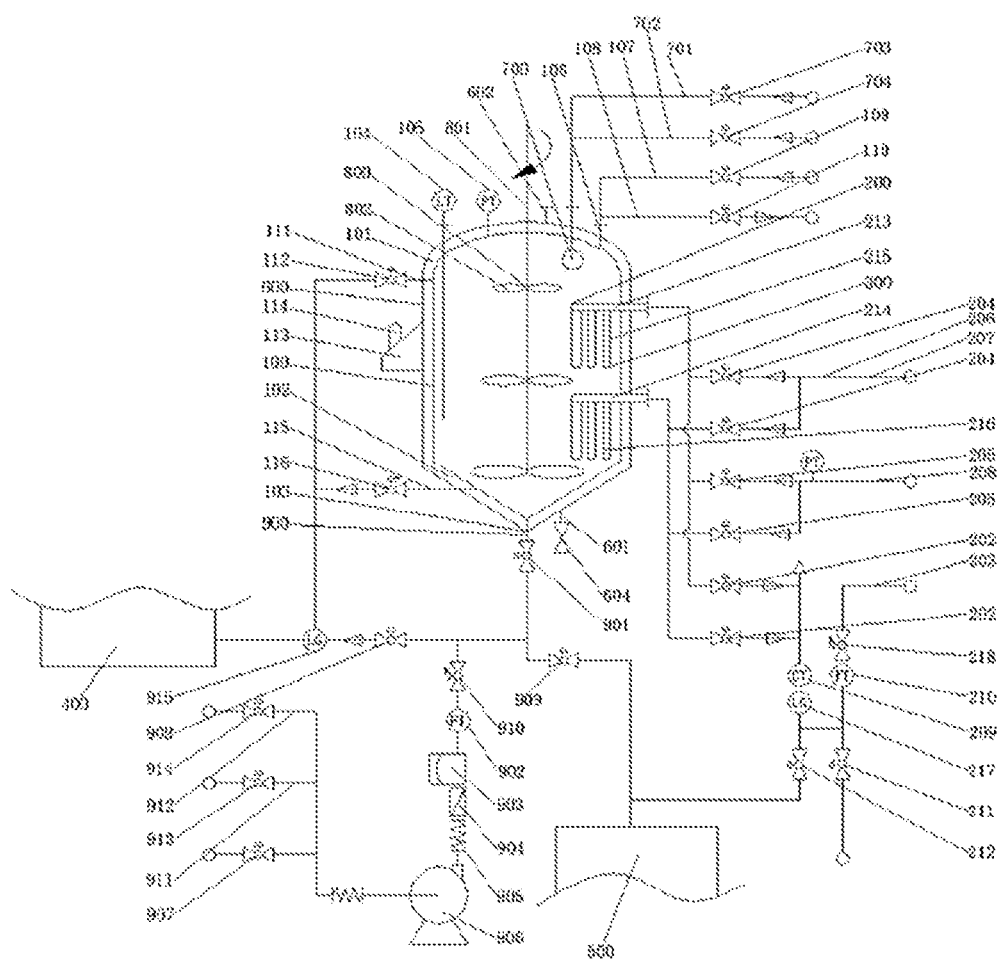
FIG. 2 is a schematic diagram of a specific implementation solution of the present invention.
Figure 3:
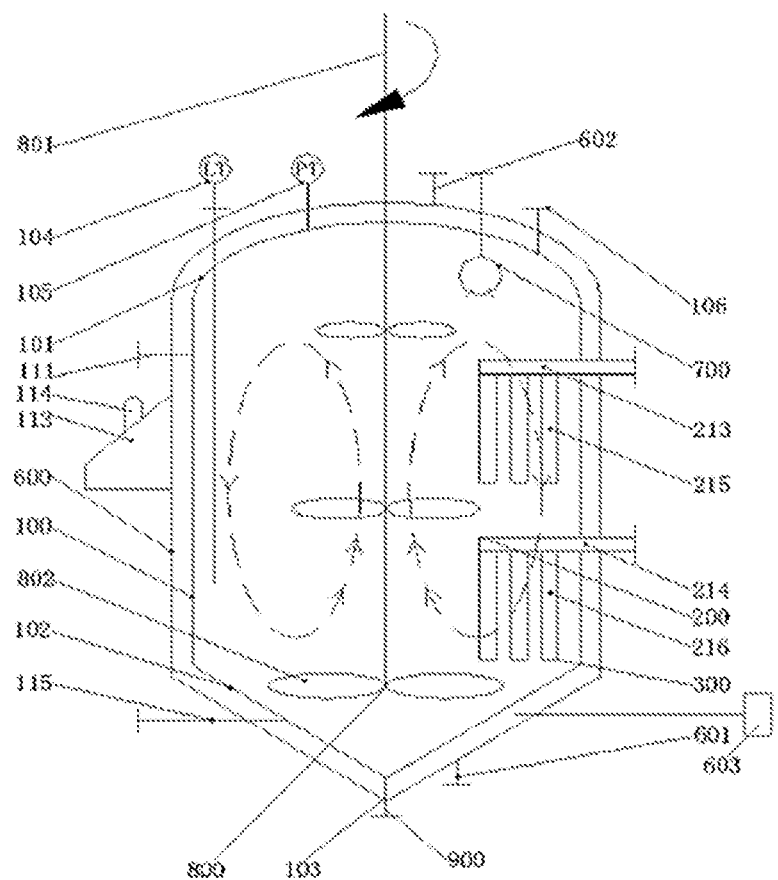
FIG. 3 is a circulating state diagram of feed liquid in a barrel in a stirring process of the present invention.
Figure 4:
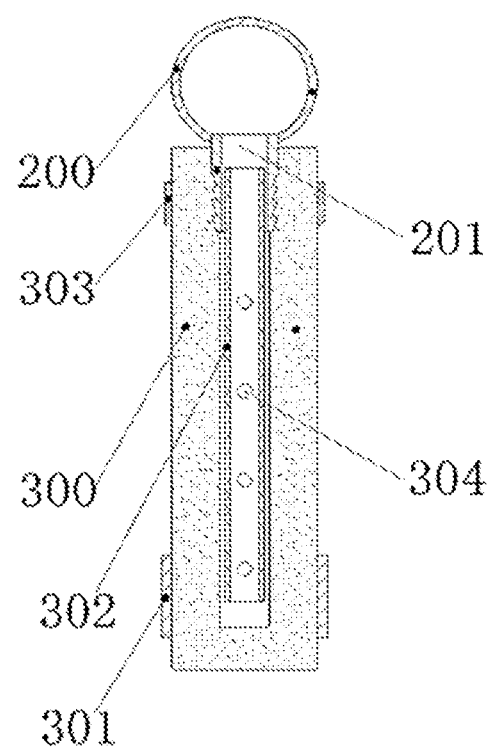
FIG. 4 is a longitudinal sectional view of a connecting structure between a discharge pipe and a microporous filtering medium in the present invention.
Figure 5:
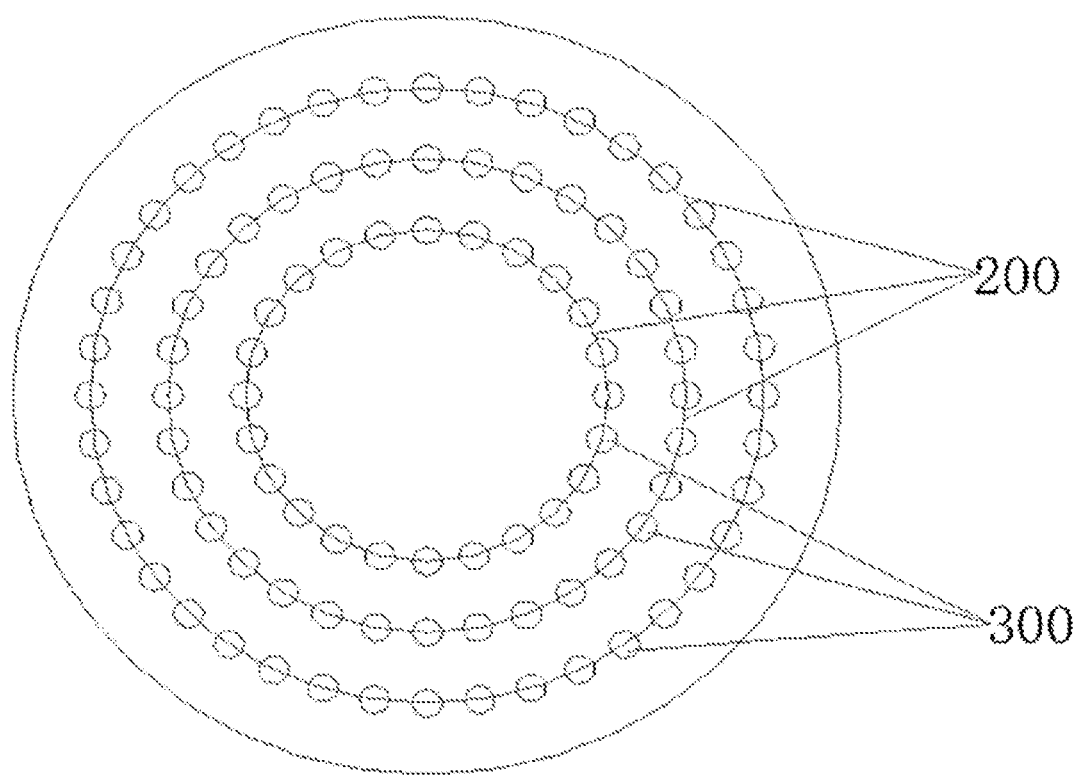
FIG. 5 is a first top structural diagram after a discharge pipe and a microporous filtering medium are connected in the present invention.
Figure 6:
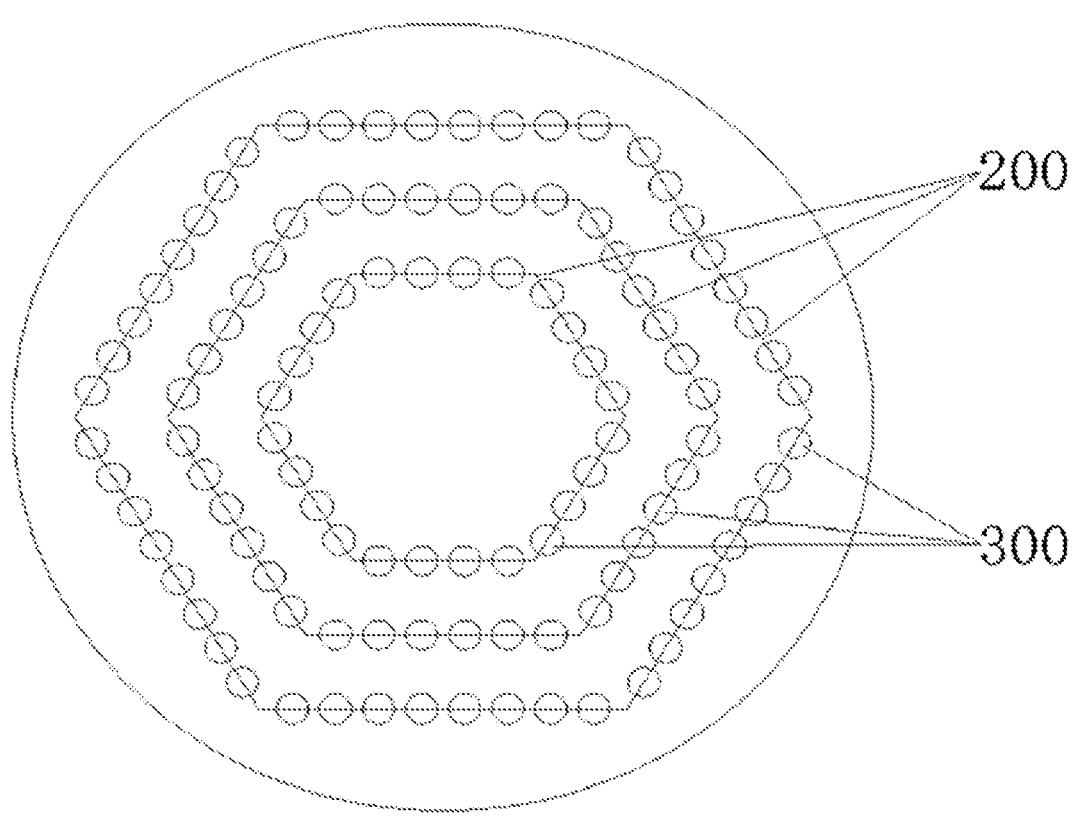
FIG. 6 is a second top structural diagram after a discharge pipe and a microporous filtering medium are connected in the present invention.

A filtering and concentrating apparatus having a stirring function for small ternary precursor particles shown in FIG. 1 and FIG. 2 comprises a barrel 100 shown in FIG. 3. One end of the barrel is provided with a first closure 101, and the other end of the barrel is provided with a second closure 102; the barrel or the first closure or the second closure is provided with a feed port 103; one or more discharge pipes 200 shown in FIG. 5 and FIG. 6 are provided on the inner wall of the barrel; microporous filtering mediums 300, shown in FIG. 4, communicated with the interior of the discharge pipe are provided on the discharge pipe; an end portion of the discharge pipe is communicated with the exterior of the barrel. The discharge pipe is composed of one or more annular pipes, the annular pipe is provided with a plurality of mounting holes 201 on the top or bottom, and the microporous filtering mediums are arranged at the mounting holes. The microporous filtering mediums are filtering pipes; the filtering pipes are arranged on the top of the annular pipe, or the filtering pipes are arranged on the bottom of the annular pipe, or the filtering pipes are arranged on the top and the bottom of the annular pipe crisscross. The plurality of annular pipes are concentrically arranged, and adjacent annular pipes are communicated; and the annular pipes are circular pipes or regular hexagonal pipes. The filtering pipes are made of ultra-high molecular weight polyethylene material, or made of filter cloth, or made of ceramic, or made of tetrafluoride material, or made of titanium powder, or made of titanium mesh, or made of metal powder, or made of metal mesh. A gap between adjacent filtering pipes on the same annular pipe is 5-100 mm. The ratio range of the length to the outside diameter of the filtering pipe is [10,50]. A plurality of filtering pipes on the same annular pipe are connected together by a clamp strip 301. Supporting pipes 302 are arranged inside the filtering pipes; the filtering pipes are arranged on the supporting pipes; and one end of each supporting pipe is arranged on the discharge pipe. One, two or three discharge pipes are provided, and the two or three discharge pipes are arranged on the inner wall of the barrel in parallel along the vertical direction. A liquid outlet valve 202 is arranged on a pipeline connected with the end portion of the discharge pipe; the liquid outlet valve is connected with a filtrate outlet pipe 203; and the filtrate outlet pipe is provided with a first regulating valve 218. The pipeline connected with the end portion of the discharge pipe is provided with a recoil valve 204 and/or a blowback valve 205; the recoil valve is connected with a filtrate inlet pipe 206 and/or a deionized water inlet pipe 207; and the blowback valve is connected with a nitrogen inlet pipe 208. A remote turbidimeter 209 is arranged on the position of the filtrate outlet pipe near the liquid outlet valve, and the filtrate outlet pipe between the remote turbidimeter and the first regulating valve is provided with a remote filtrate flowmeter 210; the filtrate outlet pipe between the remote turbidimeter and the remote filtrate flowmeter is provided with an initial filtrate return valve 211, and the initial filtrate return valve is connected with a reactor 400 through a pipeline; the filtrate outlet pipe between the remote turbidimeter and the remote filtrate flowmeter is provided with a first regenerated material valve 212; and the first regenerated material valve is connected with a regeneration tank 500 through the pipeline. An insulation layer 600 is arranged outside the barrel; the insulation layer is a jacket or insulation cotton; the jacket is provided with a first interface 601 and a second interface 602; and the jacket is connected with a constant temperature heating device 603. The first closure is connected with a remote level gauge 104 and a remote pressure transmitter 105. The first regulating valve and the second regulating valve are electric valves or pneumatic valves.

The first closure is connected with a spray apparatus 700; the spray apparatus is located inside the barrel; the spray apparatus is respectively connected with a first regenerated liquid pipe 701 and a first deionized water pipe 702; the first regenerated liquid pipe is provided with a first regenerated liquid valve 703; and the first deionized water pipe is provided with a first deionized water valve 704. The spray apparatus is a spray ball or a spray discharge pipe. A second technical connecting pipe 111 is arranged at the position on the barrel near the first closure; the second technical connecting pipe is provided with an overflow valve 112; and the second technical connecting pipe is connected with the reactor. The first closure is provided with a first technical connecting pipe 106; the first technical connecting pipe is respectively connected with an air intake pipe 107 and an air relief pipe 108; the air intake pipe is provided with an air intake valve 109; and the air relief pipe is provided with an air relief valve 110. A stirring means is provided inside the barrel. The stirring means comprises a stirring shaft 801; the stirring shaft is provided with one layer, two layers, three layers or four layers of stirring paddles 802; the lengths of the two layers, three layers or four layers of stirring paddles are the same; or the lengths of the two layers, three layers or four layers of stirring paddles are decreased from the direction of the second closure to the first closure. Two discharge pipes are a first discharge pipe 213 and a second discharge pipe 214 respectively; the microporous filtering medium at the first discharge pipe is a first microporous filtering medium 215, and the microporous filtering medium at the second discharge pipe is a second microporous filtering medium 216; and the three layers of stirring paddles are respectively located above the first microporous filtering medium, above the second microporous filtering medium and below the second microporous filtering medium. The length ratio of the three layers of the stirring paddles from the direction of the second closure to the first closure is 5:4:3. A support 113 is arranged outside the jacket or on the barrel or on the first closure or the second closure, and the support is provided with a lifting lug 114. The second closure is of a V-shaped structure, or spherical crown structure, or ellipsoidal structure, or flat bottom structure; and the first closure is of ellipsoidal structure. The barrel or the second closure is provided with a third technical connecting pipe 115; the third technical connecting pipe is provided with a second regulating valve 116; and the third technical connecting pipe is connected with the reactor. A feed pipe 900 is connected at the feed port; a pneumatic ball valve 901 is arranged at the position on the feed pipe near the feed port; the pneumatic ball valve is connected with a remote feed flowmeter 902, a damper 903, a check valve 904, a hose 905, a diaphragm pump 906 and a feed valve 907 successively; the feed pipe is connected with the reactor through the pipeline; the pipeline between the feed pipe and the reactor is provided with a thickened pulp return valve 908; the feed pipe is connected with the regeneration tank through the pipeline; the pipeline between the feed pipe and the regeneration tank is provided with a second regenerated material valve 909; the pipeline between the pneumatic ball valve and the remote feed flowmeter is provided with a third regulating valve 910; the pipeline between the diaphragm pump and the feed valve is provided with a second regenerated liquid pipe 911 and a second deionized water pipe 912 in parallel; the second regenerated liquid pipe is provided with a second regenerated liquid valve 913; and the second deionized water pipe is provided with a second deionized water valve 914. The pipeline between the pneumatic ball valve and the reactor is provided with a first sight glass 915, and a second sight glass 217 is arranged on the position of the filtrate outlet pipe near the remote turbidimeter. The pressure of nitrogen in the nitrogen inlet pipe is 0.55-0.65 MPa. The stirring speed of the stirring means is 30-300 rpm. The barrel, the upper closure and the lower closure are of an integral structure. The supporting pipes are provided with a plurality of circulation holes 304 or circulation grooves.

A filtering and concentrating apparatus having a stirring function for small ternary precursor particles shown in FIG. 1 and FIG. 2 comprises a barrel 100 shown in FIG. 3. One end of the barrel is provided with a first closure 101, and the other end of the barrel is provided with a second closure 102; the barrel or the first closure or the second closure is provided with a feed port 103; one or more discharge pipes 200 shown in FIG. 5 and FIG. 6 are provided on the inner wall of the barrel; microporous filtering mediums 300, shown in FIG. 4, communicated with the interior of the discharge pipe are provided on the discharge pipe; an end portion of the discharge pipe is located outside the barrel. The discharge pipe is composed of one or more annular pipes, the annular pipe is provided with a plurality of mounting holes 201 on the top or bottom, and the microporous filtering mediums are arranged at the mounting holes. The microporous filtering mediums are filtering pipes; the filtering pipes are arranged on the top of the annular pipe, or the filtering pipes are arranged on the bottom of the annular pipe, or the filtering pipes are arranged on the top and the bottom of the annular pipe crisscross. The plurality of annular pipes are concentrically arranged, and adjacent annular pipes are communicated; and the annular pipes are circular pipes or regular hexagonal pipes. The filtering pipes are made of ultra-high molecular weight polyethylene material. A gap between adjacent filtering pipes on the same annular pipe is 5-100 mm. The ratio range of the length to the outside diameter of the filtering pipe is [10,50]. A plurality of filtering pipes on the same annular pipe are connected together by a clamp strip 301. Supporting pipes 302 are arranged inside the filtering pipes; the filtering pipes are arranged on the supporting pipes; and one end of each supporting pipe is arranged on the discharge pipe. One, two or three discharge pipes are provided, and the two or three discharge pipes are arranged on the inner wall of the barrel in parallel along the vertical direction. A liquid outlet valve 202 is arranged on a pipeline connected with the end portion of the discharge pipe; the liquid outlet valve is connected with a filtrate outlet pipe 203; and the filtrate outlet pipe is provided with a first regulating valve 218. The pipeline connected with the end portion of the discharge pipe is provided with a recoil valve 204 and/or a blowback valve 205; the recoil valve is connected with a filtrate inlet pipe 206 and/or a deionized water inlet pipe 207; and the blowback valve is connected with a nitrogen inlet pipe 208. A remote turbidimeter 209 is arranged on the position of the filtrate outlet pipe near the liquid outlet valve, and the filtrate outlet pipe between the remote turbidimeter and the first regulating valve is provided with a remote filtrate flowmeter 210. The filtrate outlet pipe between the remote turbidimeter and the remote filtrate flowmeter is provided with an initial filtrate return valve 211, and the initial filtrate return valve is connected with a reactor 400 through a pipeline. The filtrate outlet pipe between the remote turbidimeter and the remote filtrate flowmeter is provided with a first regenerated material valve 212; and the first regenerated material valve is connected with a regeneration tank 500 through the pipeline. An insulation layer 600 is arranged outside the barrel. The insulation layer is a jacket or insulation cotton. The jacket is provided with a first interface 601 and a second interface 602; and the jacket is connected with a constant temperature heating device 603. The first closure is connected with a remote level gauge 104 and a remote pressure transmitter 105. The first closure is connected with a spray apparatus 700; the spray apparatus is located inside the barrel; the spray apparatus is respectively connected with a first regenerated liquid pipe 701 and a first deionized water pipe 702; the first regenerated liquid pipe is provided with a first regenerated liquid valve 703; and the first deionized water pipe is provided with a first deionized water valve 704. The spray apparatus is a spray ball or a spray discharge pipe.

The first closure is provided with a first technical connecting pipe 106; the first technical connecting pipe is respectively connected with an air intake pipe 107 and an air relief pipe 108; the air intake pipe is provided with an air intake valve 109; and the air relief pipe is provided with an air relief valve 110. A second technical connecting pipe 111 is arranged at the position on the barrel near the first closure; the second technical connecting pipe is provided with an overflow valve 112; and the second technical connecting pipe is connected with the reactor. A stirring means is provided inside the barrel. The stirring means comprises a stirring shaft 801; the stirring shaft is provided with one layer, two layers, three layers or four layers of stirring paddles 802; the lengths of the two layers, three layers or four layers of stirring paddles are the same; or the lengths of the two layers, three layers or four layers of stirring paddles are decreased from the direction of the second closure to the first closure. Two discharge pipes are a first discharge pipe 213 and a second discharge pipe 214 respectively; the microporous filtering medium at the first discharge pipe is a first microporous filtering medium 215, and the microporous filtering medium at the second discharge pipe is a second microporous filtering medium 216; and the three layers of stirring paddles are respectively located above the first microporous filtering medium, above the second microporous filtering medium and below the second microporous filtering medium. The length ratio of the three layers of the stirring paddles from the direction of the second closure to the first closure is 5:4:3. A support 113 is arranged outside the jacket, and the support is provided with a lifting lug 114. The second closure is of a V-shaped structure. The barrel or the second closure is provided with a third technical connecting pipe 115; the third technical connecting pipe is provided with a second regulating valve 116; and the third technical connecting pipe is connected with the reactor. A feed pipe 900 is connected at the feed port; a pneumatic ball valve 901 is arranged at the position on the feed pipe near the feed port; and the pneumatic ball valve is connected with a remote feed flowmeter 902, a damper 903, a check valve 904, a hose 905, a diaphragm pump 906 and a feed valve 907 successively. The feed pipe is connected with the reactor through the pipeline, and the pipeline between the feed pipe and the reactor is provided with a thickened pulp return valve 908. The feed pipe is connected with the regeneration tank through the pipeline, and the pipeline between the feed pipe and the regeneration tank is provided with a second regenerated material valve 909. The pipeline between the pneumatic ball valve and the remote feed flowmeter is provided with a third regulating valve 910. The pipeline between the diaphragm pump and the feed valve is provided with a second regenerated liquid pipe 911 and a second deionized water pipe 912 in parallel; the second regenerated liquid pipe is provided with a second regenerated liquid valve 913; and the second deionized water pipe is provided with a second deionized water valve 914. The pipeline between the pneumatic ball valve and the reactor is provided with a first sight glass 915, and a second sight glass 217 is arranged on the position of the filtrate outlet pipe near the remote turbidimeter. The pressure of nitrogen in the nitrogen inlet pipe is 0.55-0.65 MPa. The stirring speed of the stirring means is 30-300 rpm. The barrel, the upper closure and the lower closure are of an integral structure. One clamp hoop 303 can be used for fixing a plurality of filtering pipes on the same annular pipe so that a plurality of filtering pipes on the same annular pipe are connected more stably, wherein clamp strips and clamp hoops can be respectively arranged on the filtering pipes near both ends. The first interface valve 604 is used for controlling the delivery of distilled water into the jacket. The first regenerated material valve and the second regenerated material valve are return valves.

Figure 7:
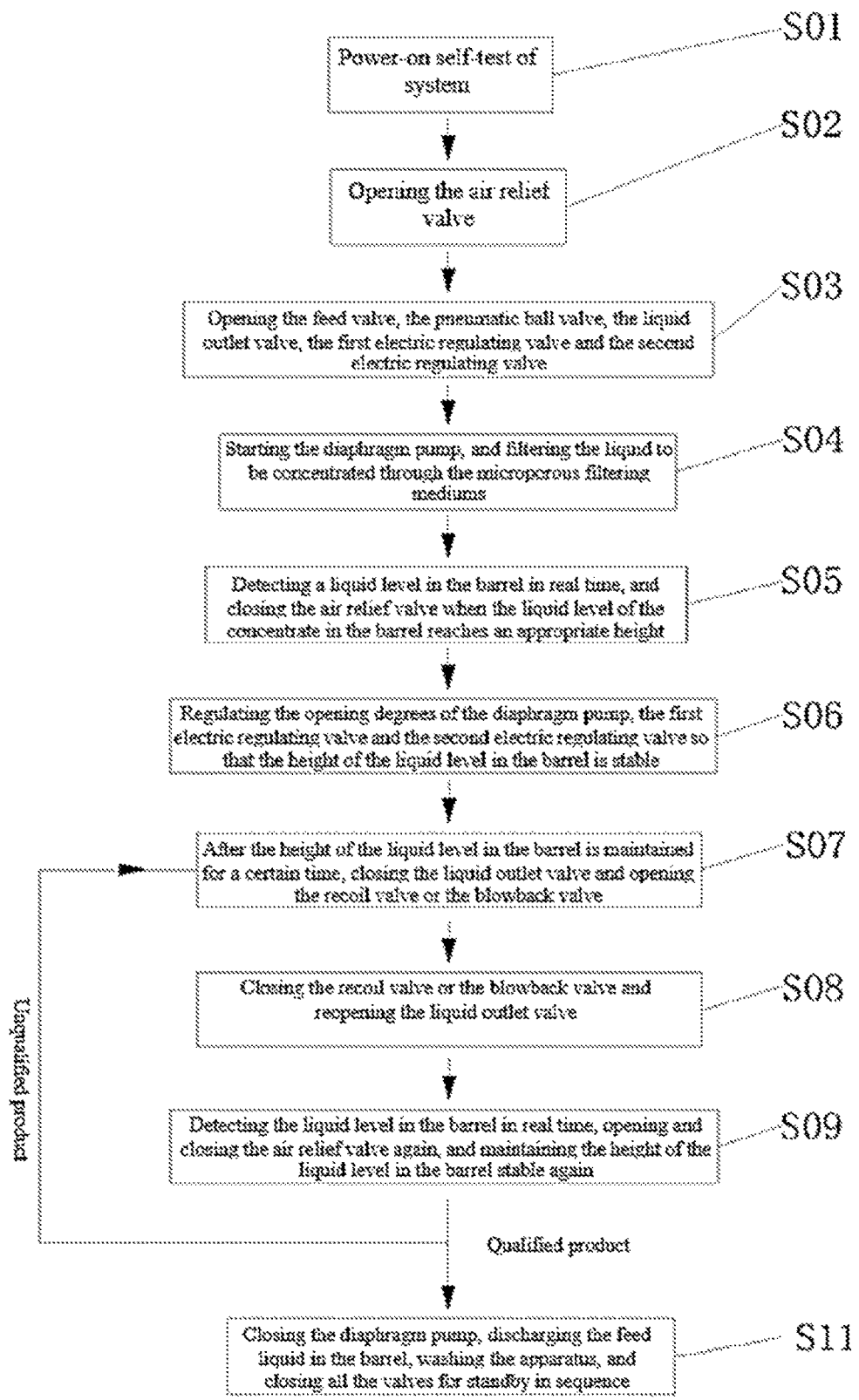
FIG. 7 is a technological flow chart of the present invention.

A concentrating method of the filtering and concentrating apparatus having the stirring function for small ternary precursor particles, as shown in FIG. 7, is carried out according to the following steps:

S01: power-on self-test of the system;

S02: opening the air relief valve to vent the interior of the barrel;

S03: after the interior of the barrel is vented, opening the feed valve, the pneumatic ball valve, the liquid outlet valve, the first regulating valve and the second regulating valve; before the first regulating valve is opened, opening the initial filtrate return valve for a certain time; the opening time of the initial filtrate return valve is 3-100 min;

S04: after all the valves in step S03 are opened, starting the diaphragm pump, conveying liquid to be concentrated into the barrel, and filtering the liquid to be concentrated through the microporous filtering mediums;

S05: detecting a liquid level in the barrel in real time, and closing the air relief valve when the liquid level of the concentrate in the barrel reaches an appropriate height; when the liquid level height of the concentrate exceeds the microporous filtering medium, the height is appropriate; The pressure in the barrel, the filtrate flow, the feed flow or opening, the flow or opening of return thickened pulp, the liquid level of the reactor and the liquid level of the intermediate tank exceed all the stirring paddles. A gas space with certain volume is preserved at the upper closure. All the stirring paddles are immersed to ensure normal stirring work. A certain gas space is reserved. Firstly, the closure is protected from being immersed into liquid to prevent the particles from entering the closure and damaging the closure. Secondly, the liquid is not sprayed to prevent product particles from accumulating and affecting batch uniformity. Thirdly, no liquid material is carried away during emptying;

S06: after closing the air relief valve, regulating the opening degrees of the diaphragm pump, the first regulating valve and the second regulating valve so that the height of the liquid level in the barrel is stable; the flow rate in the pipeline at the first regulating valve and/or the second regulating valve is 10 L/h-10000 L/h;

S07: after the height of the liquid level in the barrel is maintained for a certain time, closing the liquid outlet valve and opening the recoil valve or the blowback valve; the time of maintaining the liquid level height in the barrel is 30-70 min;

S08: after the recoil valve or the blowback valve is opened for a certain time, closing the recoil valve or the blowback valve and reopening the liquid outlet valve; the time of opening the recoil valve is 3-200 S and the time of opening the blowback valve is 2-100 S;

S09: detecting the liquid level in the barrel in real time, opening and closing the air relief valve again, maintaining the height of the liquid level in the barrel stable again, and circulating to step S07; timing or setting the flow of the filtrate;

S10: repeating step S09 until a product detected in the reactor is qualified;

S11: closing the diaphragm pump, discharging the feed liquid in the barrel, washing the apparatus, and closing all the valves for standby in sequence.

The flows in the whole reaction process satisfy the following formulas:

formula 1: the total flow of reaction in the reactor=the flow of a finished product after deaging in the reactor+ the flow of the filtrate in the filtering and concentrating apparatus;

formula 2: the feed flow of the diaphragm pump=the flow through the second regulating valve+the flow of the filtrate in the filtering and concentrating apparatus.

Formula 3: the feed flow of diaphragm pump=2-20 times of filtrate flow in the filtering and concentrating apparatus.

The present invention has the operating principle that:

The power-on self-test of the system is conducted. The first interface valve 604 is opened. The steam flows in from the top and flows out from the bottom; hot liquid flows in from the bottom and flows out from the top, and the bottom needs to be emptied. Distilled water or other heating liquid is added into the jacket. The device is directly preheated by heating the distilled water or heating liquid inside the jacket through the constant temperature heating device 603, so as to directly satisfy the process requirement of about 65° C. The jacket can be replaced with the insulation cotton, but hot air or hot water needs to be used prior to feeding to preheat the device. Feeding is conducted when the temperature of the device satisfies the process requirements, and the insulation cotton is used to maintain a relatively constant temperature of the device. The air relief valve 110 is opened to vent the interior of the barrel 100. After the interior of the barrel is vented, the air relief valve 110 is closed and the feed valve 907, the third regulating valve 910, the second regulating valve 116, the liquid outlet valve 202 and the initial filtrate return valve 211 are respectively opened; and then the diaphragm pump 906 and the stirring means 800 are opened. At this moment, the feed liquid enters the pipeline at the feed valve 907 from the reactor 400 and/or the intermediate tank. Under the action of the diaphragm pump 906, the feed liquid enters the barrel 100, wherein the diaphragm pump provides power for the flow of the feed liquid. Meanwhile, the diaphragm pump also has the function of regulating the flow rate of the feed liquid. The hose 905 can reduce the influence of the vibration of the diaphragm pump on the pipeline. The check valve 904 can prevent the feed liquid from flowing back and damaging the diaphragm pump. The damper 903 can reduce the impact vibration intensity of the feed liquid that enters the pipeline, so that the remote feed flowmeter can detect the flow rate of feeding in the pipeline more stably. The remote feed flowmeter 902 can detect the flow rate of the feed liquid entering the barrel in real time and specifically regulate the flow rate and the feeding capacity of the feed liquid entering the barrel reasonably. The pneumatic ball valve 901 can be used to remotely control the opening and closing of feeding in the barrel 100. The liquid outlet valve 202 can control the communication or barrier between the filtrate outlet pipe 203 and the interior of the barrel. Since the solid particles in the feed liquid which enters the barrel are the initial products at a period of time at the beginning of the filtration and concentration, the crystal nucleus particles of the solid particles are just generated, and the particle size will be less than 0.1 micron. At this time, the solid can pass through the filtering holes of the filtering pipes and is discharged with the filtrate. Thus, the filtrate contains the required solid particles during this period of time. Therefore, it is necessary to completely close the first regulating valve 218 and open the initial filtrate return valve 211 in this period of time so that the filtrate containing small solid particles in this period of time return to the reactor for growing crystals, until the small solid particles become large. This period of time should last about 10 min. Data from the remote turbidimeter 209 shows that after the amount of the small solid particles in the filtrate reaches an appropriate value, the initial filtrate return valve is closed, the first regulating valve is opened and the opening is adjusted to carry out the normal filtration and concentration work. The first regulating valve 218 can regulate and control the flow of the discharged filtrate in the filtrate outlet pipe 203 as required to cooperate with other valves to maintain the filtration and flowing stability of the whole feed liquid in the barrel 100, to ensure that the feed liquid in the barrel achieves a more efficient filtration and concentrating effect at the best flow rate. In the flow process of the filtrate, the remote turbidimeter 209 can inspect the content of the solid particles in the filtrate in time, so that operators can understand the state of the filtering pipes. If the content of the solid particles in the filtrate exceeds the standard through detection by the remote turbidimeter, it is convenient for the operators to check the reason in time, so as to ensure that there is no problem of cross leakage or cross filtration or mixing of the required solid particles from the filtering pipes. The remote filtrate flowmeter 210 can detect the flow of the filtrate discharged from the filtrate outlet pipe 203 in real time, to understand the filtration and concentration rate in the barrel in time, to ensure high efficiency of the whole filtration and concentration. The second sight glass 217 can be used to observe the liquid flow in the corresponding pipeline, and the operators can intuitively understand the feed liquid circulation inside the corresponding pipeline. The second regulating valve 116 is used for regulating the flow rate of entering the reactor 400 by the remaining thickened pulp of the solid particles after filtration and concentration in the barrel 100. The first regulating valve 218, the second regulating valve 116 and the diaphragm pump 906 conduct coordinate regulation through mutual degrees of opening, so that the feed liquid in the barrel 100 is always at the stable liquid level height. The feed liquid in the barrel is always in a circulating operating state. Through the coordinate regulation of the first regulating valve, the second regulating valve and the diaphragm pump by mutual degrees of opening, the flow rate of feeding can be accelerated appropriately as required and the feeding capacity in the reactor 400 can be increased, so that the whole reaction system can achieve high production efficiency. The arrangement of the stirring means 800 enables a filter cake falling from the filtering pipe to the barrel 100 after recoil or blowback to be broken up in time after falling under the disturbance of stirring to return to the reactor to participate in crystallization, thereby ensuring that the solid entering the reactor 400 can have uniform particle size. The layers of the stirring paddles and the lengths of the stirring paddles 802 can be flexibly adjusted according to the characteristics of the material as required, so that the filter cake falling from the filtering pipe can be better broken up. The layers of the stirring paddles are preferably two layers or three layers, and the lengths of the three layers of stirring paddles are preferably decreased from the direction of the second closure 102 to the first closure 101. The length ratio of the three layers of the stirring paddles 802 is especially designed according to the downward settling direction of the falling filter cake. The disturbance amplitude of the three layers of the stirring paddles to the feed liquid is gradually decreased from the direction of the second closure to the first closure, which conforms to the attribute requirements that the filter cake settles from top to bottom and the disturbance and breaking strength is increased gradually. The filter cake which is not broken up by the upper layer of the stirring paddle in the settling process from top to bottom may be broken up by the lower layer of the stirring paddle with larger strength in the declining process, thereby ensuring that the filter cake settling to the lower part of the barrel 100 is completely broken up and ensuring the diameter of the crystal nuclei of the solid particles entering the reactor 400. Meanwhile, the stirring action can also promote the friction between the solid particles in the feed liquid, making the surfaces of the solid particles more round and improving the morphology of the crystal nuclei.

The remote level gauge 104 and the remote pressure transmitter 105 are observed in real time. The air intake valve 109 and the air relief valve 110 are appropriately adjusted. The remote level gauge 104 is used for detecting the liquid level height of the feed liquid in the barrel 100 in real time, and the remote pressure transmitter 105 is used for detecting the air pressure in the barrel 100 in real time, which is convenient for the understanding of the operators and specific regulation and control. The coordinate regulation of the air intake valve 109 and the air relief valve 110 can ensure that the feed liquid is always at a stable liquid level height in the barrel 100. When the remote level gauge 104 shows that the liquid level is too high, the air intake valve 109 is opened and nitrogen is introduced into the barrel 100 so that the liquid level of the feed liquid in the barrel is reduced to a desired height. When the remote level gauge 104 shows that the liquid level is too low, the air relief valve 110 is opened and gas in the barrel 100 is discharged so that the liquid level of the feed liquid in the barrel is increased to the desired height. The best height of the liquid level in the barrel is not higher than the height of the microporous filtering mediums 300. After the height of the liquid level in the barrel 100 is maintained for 100 min, the liquid outlet valve 202 is closed and the recoil valve 204 or the blowback valve 205 is opened. The recoil valve 204 can control whether the filtrate or deionized water is introduced into the discharge pipe 200 as required, so as to rinse the interior of the pipeline. The blowback valve 205 can control whether nitrogen is introduced into the discharge pipe 200 as required, so as to purge the interior of the pipeline. Since more solid particle materials block the filtering holes of the filtering pipes after the filtering pipes work for a period of time, the recoil valve 204 or the blowback valve 205 needs to be used for recoil or blowback for the discharge pipe 200. The first purpose is to blow away the solid particle materials at the filtering holes from the filtering holes in time, so that the filtering pipes maintain a good filtration effect; and the second purpose is to enable the solid particles on the filtering pipes to return to the reactor in time to participate in crystallization and enable the solid particles on the filtering pipes to return to the barrel in time to participate in crystallization. After recoil for 80 s or blowback for 70 s, the blowback valve 205 or the recoil valve 204 is closed and the liquid outlet valve 202 is reopened until a product detected in the reactor 400 is qualified. When the reaction stops, the diaphragm pump 906 and the feed valve 907 are closed and the thickened pulp return valve 908 is opened. At this moment, the feeding for the barrel 100 has stopped, and the thickened pulp feed liquid that does not return to the reactor 400 from the second regulating valve 116 in the barrel 100 needs to be discharged. At this moment, only the thickened pulp return valve 908 needs to be opened to thoroughly discharge all the thickened pulp feed liquid in the barrel 100 into the reactor 400. When the solid particle blocks deposited in the barrel 100 and the pipeline need to be dissolved, the second regenerated liquid valve 913, the second regenerated material valve 212 and the first regenerated liquid valve 703 are opened. After the second regenerated liquid valve is opened, dilute sulfuric acid can be introduced into the corresponding pipeline to dissolve the solid particle blocks in the relevant pipeline. When the solid particle blocks in the corresponding pipeline are dissolved, the dilute sulfuric acid is discharged, and then the second deionized water valve 914 is opened. The deionized water is used to thoroughly rinse the interior of the corresponding pipeline to ensure that the corresponding pipeline is always in a good liquid circulation state. Or, after a filtration and concentration job is completed ordinarily, it is found that no solid particle block is deposited inside the corresponding pipeline. At this moment, there is no need to spray the dilute sulfuric acid into the barrel 100, and the second deionized water valve 914 is opened only to introduce the deionized water into the corresponding pipeline for washing. After the filtering and concentrating apparatus is used for a long time, many solid particles are consolidated in some corners between the filtering pipes and the discharge pipes and inside other pipelines or even barrel. The solid particles can affect the flow rate of the filtrate in the pipelines in normal filtration and concentration. At this moment, the solid particles should be cleaned with sulfuric acid, preferably dilute sulfuric acid. The solid particle blocks in the filtrate outlet pipe 203 and other pipelines are dissolved to ensure the discharge velocity of the filtrate in the filtrate outlet pipe 203 and ensure the efficient and stable filtration and concentration work. The regeneration tank 500 is filled with the sulfuric acid for dissolving the solid particle blocks in the pipeline, and the first regenerated material valve 212 is used to control the communication between the regeneration tank 500 and the interior of the concentrating apparatus. The spray apparatus 700 is used to wash the device after a reaction is completed or after the filtering and concentrating apparatus is used for a period of time. When too many solid particle blocks are deposited inside the barrel 100 or the pipelines, the first regenerated liquid valve 212 can be opened to inject dilute sulfuric acid into the barrel 100 for dissolving the solid particle blocks inside the barrel 100 or the pipelines. After dissolution, the dilute sulfuric acid is discharged, and then the first deionized water valve 704 is opened. The deionized water is used to thoroughly rinse the interior of the barrel 100 and the relevant pipelines to ensure that the device is always in a good filtration and concentration state. Or, after a filtration and concentration job is completed ordinarily, it is found that no solid particle block is deposited inside the barrel 100. At this moment, there is no need to spray the dilute sulfuric acid into the barrel, and the first deionized water valve 704 is opened only to spray deionized water into the barrel 100 for washing, thereby completing a working cycle. When the flow of the feed liquid entering the barrel 100 is too large so that the liquid level of the feed liquid in the barrel 100 is too high, the overflow valve 112 can be opened to enable redundant feed liquid in the barrel 100 to return to the reactor 400 to ensure that the feed liquid in the barrel 100 is not too full. The support is used for installation of the barrel so that the top and the bottom of the barrel are simultaneously hung in the air for conducting other technological operation, thereby overcoming the installation mode that the existing barrel can only be flatwise placed on the ground. The lifting lug is used for lifting and declining the barrel during installation of the barrel. The existing device is on the ground. Before the pump is stopped, a certain amount of water is automatically injected into the pipeline to prevent the pump, the valve and the pipeline from being blocked by particle deposition.

The filtering and concentrating apparatus having the stirring function for small ternary precursor particles comprises a barrel 100. The upper end and the lower end of the barrel 100 are provided with a first closure 101 and a second closure 102 respectively. A jacket is arranged outside the barrel 100, the first closure 101 and the second closure 102. Process requirements: the device body material should be heated to required temperature before each batch of feeding, to avoid causing material temperature change and affecting product quality when the material enters the filtering and concentrating apparatus. The jacket is arranged so that the device is directly preheated through the mechanism of electric heating. If the jacket is not arranged, hot air or hot water needs to be used generally prior to feeding to preheat the device for feeding. The jacket is arranged according to the process requirements. If not necessary, the role of the jacket can be replaced with insulation cotton. A third technical connecting pipe 115 is arranged at the side of the second closure 102. The third technical connecting pipe is a connecting pipe for circulation of the thickened pulp, and the height and the direction of the connecting pipe can be adjusted according to the position of the site. A second technical connecting pipe 111 is arranged on the side of the barrel 100. The first discharge pipe 213 and the second discharge pipe 214 can also be configured as single-layer discharge pipes. The first discharge pipe 213 and the second discharge pipe 214 are respectively provided with a first microporous filtering medium 215 and a second microporous filtering medium 216. A stirring means 800 is provided in the barrel 100. The first closure 101 is provided with a remote level gauge 104. Specifically, the remote level gauge is a capacitance level gauge or radar, a remote pressure transmitter 105 and the first technical connecting pipe 106. A spray apparatus 700 is arranged in the first closure 101, which is specifically a spray ball or a spray discharge pipe structure. The stirring means 800 comprises a stirring shaft 801; the stirring shaft is provided with three layers of stirring paddles 802; the number of the layers of the stirring paddles can be four or/and three or/and two or/and one; and the lengths of the three layers or/and four layers or/and two layers of stirring paddles are gradually decreased from bottom to top or/and the same as the lengths of stirring blades. A support 113 is arranged on the side of the jacket or/and the barrel 100. The three layers of stirring paddles 802 are respectively located above the first microporous filtering medium 215, above the second microporous filtering medium 216 and below the second microporous filtering medium 216; the length ratio of the three layers of the stirring paddles 802 from bottom to top is 5:4:3 or/and 1:1:1; and the turning directions are upward or/and downward. The first microporous filtering medium 215 and the second microporous filtering medium 216 have a length ratio of 0.3-3, and can also be configured as single-layer filtering mediums. The first microporous filtering medium 215 and the second microporous filtering medium 216 have the same structure, and each comprises a plurality of filtering pipes. The plurality of filtering pipes are arranged in concentric circles or hexagonal array, the gap between adjacent filtering pipes is 5-100 mm, and the ratio of the length to the outside diameter of the filtering pipes is less than or equal to 50. The spray apparatus 700 is connected with a first regenerated liquid pipe 701 and a first deionized water pipe 702 which are arranged in parallel. The first regenerated liquid pipe and the first deionized water pipe are respectively provided with a first regenerated liquid valve 703 and a first deionized water valve 704. The first technical connecting pipe 106 is connected with an air intake pipe 107 and an air relief pipe 108 which are arranged in parallel. The air intake pipe and the air relief pipe are respectively provided with an air intake valve 109 and an air relief valve 110.

The second technical connecting pipe 111 is connected with an overflow valve 112. The second technical connecting pipe and the overflow valve are not necessary. When the solid content in the thickened pulp is high and the flow is large, the connecting pipe can be used as a standby connecting pipe of circulating the thickened pulp to return to the reactor 400. The third technical connecting pipe 115 is connected with a second electric regulating valve 116 which must be arranged, to control the size of the flow of the returned thickened pulp. A feed pipe 900 on the bottom of the second closure 102 is connected with a pneumatic ball valve 901. The pneumatic ball valve 901 is connected with a thickened pulp return valve 908 and a second regenerated material valve 909 arranged in parallel. The overflow valve 112, the second electric regulating valve 116 and the thickened pulp return valve 908 are connected to the reactor 400; the second regenerated material valve 909 is connected to the regeneration tank 500; a third electric regulating valve 910 is connected between the pneumatic ball valve 901 and the thickened pulp return valve 908; the third electric regulating valve is not necessary, and the diaphragm pump 906 can be directly controlled to conduct control; the third electric regulating valve 910 is successively connected with a remote feed flowmeter 902 which is not necessary, a damper 903, a check valve 904, a hose 905 and the diaphragm pump 906; the diaphragm pump is pneumatic or electric and has the function of automatic flow adjustment; and the diaphragm pump 906 is connected with a second deionized water valve 914 arranged in parallel. Before the diaphragm pump 906 is stopped, water is injected into the pipeline to clean the solid particles in the pipeline to avoid blocking the pipeline, the second regenerated liquid valve 913 and the feed valve 907 due to settling of the solid particles. The first discharge pipe 213 is connected with the recoil valve 204, the blowback valve 206 and the liquid outlet valve 202 which are arranged in parallel; the second discharge pipe 214 is also connected with the recoil valve 204, the blowback valve 206 and the liquid outlet valve 202 which are arranged in parallel; the recoil valve 204 is connected to the filtrate inlet pipe 206 or the deionized water inlet pipe 207; the blowback valve 206 is connected to the nitrogen inlet pipe 208; the liquid outlet valve (202) is connected with a remote turbidimeter 209; and the remote turbidimeter 209 is connected with the first regenerated material valve 212 and the initial filtrate return valve 211 which are arranged in parallel. In the initial stage, when the crystal nucleus particles are initially generated and are less than 0.1 micron, all the particles need to be returned to the reactor for growing crystals. The first regenerated material valve 212 and the initial filtrate return valve 211 are respectively connected to the regeneration tank 500 and the reactor 400; the remote filtrate flowmeter 210 is connected between the initial filtrate return valve 211 and the remote turbidimeter 209; and the remote filtrate flowmeter 210 is connected with the first electric regulating valve 218. The pressure of nitrogen or other compressed gas that does not affect the process requirements for entrance in the pipe is 0.55-0.65 MPa. The stirring speed of the stirring means 800 is controlled at 30-300 rpm.

A concentrating method of the filtering and concentrating apparatus having the stirring function for small ternary precursor particles is carried out according to the following steps:

Step 1: conducting power-on self-test of the system, starting an automatic control system, and detecting valve state or opening, pressure and stirring;

Step 2: preparing feeding and opening the air relief valve 110 for venting;

Step 3: opening the thickened pulp return valve 908, the third electric regulating valve 910, the feed valve 907 and the diaphragm pump 906;

Step 4: opening the pneumatic ball valve 901, and closing the thickened pulp return valve 908, wherein the pneumatic ball valve is ultrathin and the accumulation of material in conventional valves may block the pipeline;

Step 5: closing the air relief valve 110 and detecting the particle size of the product and the particle distribution in the reactor 400;

Step 6: opening the liquid outlet valve 202 and the first electric regulating valve 218 for draining the filtrate; or opening the liquid outlet valve 202 and the initial filtrate return valve 211 to return to the reactor 400;

Step 7: detecting the pressure, liquid level, filtrate flow, feed flow and stirring revolutions in real time, and stabilizing the filtrate flow by adjusting the first electric regulating valve 218 and the second electric regulating valve 116;

Step 8: closing the liquid outlet valve and opening the recoil valve or the blowback valve regularly;

Step 9: opening the liquid outlet valve regularly;

Step 10: detecting the liquid level, opening the air relief valve 110 for venting and circulating step 7;

Step 11: repeating step 10 until the product detected in the reactor 400 is determined to be qualified;

Step 12: stopping the pump, discharging the material, cleaning and standby; and before the pump is stopped, injecting water to rinse the pipeline.

After stirring and rotation, the liquid in the device is disturbed, and feeding is conducted from the upper part and/or lower part and/or middle part according to the feed need. The thickened pulp correspondingly returns from the middle lower part and/or middle upper part. The disturbance direction of the liquid is consistent with the feeding direction. The recommended flow direction is: as shown in FIG. 3, the liquid is turned up in the middle and turned down at the periphery. If the solid in the middle is more favorable to settlement, the solid is driven to roll up by the liquid to maintain the balance of solid and liquid content. The first microporous filtering medium 215 and the second microporous filtering medium 216 are preferably made of ultra-high molecular weight polyethylene material by sintering.

The present invention controls the filtrate flow, stirring revolutions, and blowback or recoil frequency and number of times according to the particle size and distribution of the product in the reactor to ensure that the pulp in the filtering and concentrating apparatus can return to the reactor in time to participate in reaction and growth. In case of small particle size and low solid content, the blowback or recoil frequency, the pressure and the stirring revolutions are low and the feeding flow and the flow of the first electric regulating valve 218 are small. In case of large particle size and high solid content, the blowback or recoil frequency, the pressure and the stirring revolutions are high and the feeding flow and the flow of the first electric regulating valve 218 are large.

Through the joint action of stirring and recoil or blowback in the present invention, the solid particles on the outer surface of the microporous filtering medium 300 can return to the reactor 400 in time to participate in the reaction and grow crystals, which not only can increase the production, but also can reduce production cost and wastewater quantity. The present invention can also improve the product morphology, size uniformity, timely return of the thickened pulp to the reactor, and narrow particle size distribution through the coordination of various structures and various parameters. The reaction period is shortened by 15%; the technical process is shortened; direct yield is increased to 98%; filtration accuracy is high no cross leakage phenomenon occurs; and material loss is low. The solid concentration of the reactor is increased by 20%-200%, the yield per unit time is increased, and the investment is large while the production cost is reduced. The wastewater quantity is reduced by 40%, the cost of wastewater treatment is reduced, the molar content of metal salt is increased, the filtrate discharge is rapid so that the reaction is accelerated, and the amount of liquid is reduced.

Comparison of New and Old Technologies

1. Old Technology
   1) The supernatant is discharged by discontinuous mode, or a settling tank, or a settling tank with filter cloth structure, under the action of gravity of particles;
   2) The thickened pulp naturally returns to the reactor by gravity;
   3) The solid particle concentration of the product may not exceed 500 g/L;
   4) The solid particles of small products are easy to lose. Because the accuracy of the filter cloth is limited, small particles will also leak and lose;
   5) The flow is limited by the device or flow speed of overflow liquid and the process time is long;
   6) The yield is low;
   7) The particles stay in the settling tank for a long time and have wide particle size distribution;
   8) Through natural settling, polycrystalline products account for a large proportion;
   9) The settling tank should be placed horizontally with the reactor, and occupies large land.

2. New Technology
   1) Dongou concentrator is used to continuously discharge the filtrate;
   2) The thickened pulp is forced to return to the reactor in time through stirring and pump;
   3) The solid particle concentration of the product is not limited by low concentration and can reach 1500 g/L;
   4) The filtration accuracy is high, the solid particles of the product do not lose, and the yield is high;
   5) The flow is large, the influence of the device is small, the process time is shortened and the process time is short;
   6) The yield is high;
   7) The particles stay in the concentrator for a short time and have narrow particle size distribution;
   8) The stirring revolutions are controlled to form single crystal products;
   9) The installation location of the concentrator relative to the reactor is not limited, and occupies a small space.

3. Realization of New Technology

The filtering pipe is strengthened, and has a supporting pipe 302 inside; the joint forms of the discharge pipe 200 are diverse, and include threaded connection and direct welding of inverted tooth joints. The filtering pipe is connected to the inverted tooth joints. The structure of the clamp strip 301 is added on the end portion of the filtering pipe; and the filtering pipes are connected in series into a whole to prevent the filtering pipes from swinging under the stirring action and causing leakage at the connection. The filtration accuracy is more than 0.2 micron to ensure no cross leakage in filtrate clarification when small particle products are made. High filtration accuracy prevents cross leakage of the small particles and ensures the yield of the products. The filtering material such as the ultra-high molecular weight polyethylene material, filter cloth, ceramic, tetrafluoride, titanium powder, titanium mesh, metal powder and metal mesh can adapt to the change of material environments. The filtering pipes are led out and used in multiple groups and then summarized, which is conducive to grouping blowback. Because the filtration area of a single group is fixed, the effective discharge effect of the filter cake in single-group blowback is ensured. The filtering pipes are led out in multiple groups, and the flow can be adjusted. When the flow needs to be large, more groups are opened, and when the flow needs to be small, fewer groups are opened. With stirring, the filter cake after grouping blowback falls off and is broken up under the disturbance of stirring. The stirring revolutions, blade forms and the number of blade layers are adjusted according to the material characteristics. The operation is automatic; and the liquid level, the pressure, the flow, the stirring revolutions, the opening and closing order of the valves, the opening of the valves and the technologies are automatic. The filtration area is increased; and concentric or polygon arrangement is favorable for stirring disturbance, manufacturing and maintenance. The particle size distribution is narrow. Under the powerful cyclic action of stirring and pumps, the thickened pulp returns to the reactor 400 in time for growing crystals and preventing the particle size distribution from being wider due to the crystal growing speed influenced by long staying time. The diaphragm pump 906 or hose pump is selected to prevent the centrifugal pump from affecting the breaking and damaging of the product particles. In operation, the filtrate outlet quantity is limited and controlled. The pulp in the concentrator returns to the reactor within limited time by increasing the feeding capacity and return quantity of the pump. Large flow can also ensure that the pulp may not settle and block the pipeline.

The invention claimed is:

1. A filtering and concentrating apparatus, comprising a barrel, wherein one end of the barrel is provided with a first closure, and the other end of the barrel is provided with a second closure; the barrel the first closure or the second closure is provided with a feed port; one or more discharge pipes are provided on the inner wall of the barrel; microporous filtering mediums communicated with the interior of the discharge pipe are provided on the discharge pipe; an end portion of the discharge pipe is communicated with the exterior of the barrel; and a stirring means is provided inside the barrel;

the discharge pipe is composed of one or more cylindrical pipes, the cylindrical pipe is provided with a plurality of mounting holes and the microporous filtering mediums are connected with the mounting holes; the microporous filtering mediums are filtering pipes; the filtering pipes are arranged on the top of the cylindrical pipe, or the filtering pipes are arranged on the bottom of the cylindrical pipe, or the filtering pipes are arranged on the top and the bottom of the cylindrical pipe crisscross; the plurality of cylindrical pipes are concentrically arranged, and adjacent cylindrical pipes are communicated; and the cylindrical pipes are circular pipes or regular hexagonal pipes;

a plurality of filtering pipes on the same cylindrical pipe are connected together by a clamp strip and/or a clamp hoop; and supporting pipes are arranged inside the filtering pipes; the filtering pipes are arranged on the supporting pipes; one end of each supporting pipe is arranged on the discharge pipe; and the supporting pipe is provided with a plurality of circulation holes or circulation grooves.

2. The filtering and concentrating apparatus according to claim 1, wherein the filtering pipes are made of ultra-high molecular weight polyethylene material, or made of filter cloth, or made of ceramic, or made of tetrafluoride material, or made of titanium powder, or made of titanium mesh, or made of metal powder, or made of metal mesh.

3. The filtering and concentrating apparatus according to claim 1, wherein one, two or three discharge pipes are provided, and the two or three discharge pipes are arranged on the inner wall of the barrel in parallel along a vertical direction.

4. The filtering and concentrating apparatus according to claim 1, wherein a liquid outlet valve is arranged on a pipeline connected with the end portion of the discharge pipe; the liquid outlet valve is connected with a filtrate outlet pipe; and the filtrate outlet pipe is provided with a first regulating valve.

5. The filtering and concentrating apparatus according to claim 1, wherein the pipeline connected with the end portion of the discharge pipe is provided with a recoil valve and/or a blowback valve; the recoil valve is connected with a filtrate inlet pipe and/or a deionized water inlet pipe; and the blowback valve is connected with a nitrogen inlet pipe.

6. The filtering and concentrating apparatus according to claim 4, wherein a remote turbidimeter is arranged on the position of the filtrate outlet pipe near the liquid outlet valve, and the filtrate outlet pipe between the remote turbidimeter and the first regulating valve is provided with a remote filtrate flowmeter; the filtrate outlet pipe between the remote turbidimeter and the remote filtrate flowmeter is provided with an initial filtrate return valve, and the initial filtrate return valve is connected with a reactor through a pipeline; the filtrate outlet pipe between the remote turbidimeter and the remote filtrate flowmeter is provided with a first regenerated material valve; and the first regenerated material valve is connected with a regeneration tank through the pipeline.

7. The filtering and concentrating apparatus according to claim 1, wherein an insulation layer is arranged outside the barrel; the insulation layer is a jacket or insulation cotton; the jacket is provided with a first interface and a second interface; and the jacket is connected with a constant temperature heating device.

8. The filtering and concentrating apparatus according to claim 6, wherein the first closure is connected with a spray apparatus; the spray apparatus is located inside the barrel; the spray apparatus is respectively connected with a first regenerated liquid pipe and a first deionized water pipe; the first regenerated liquid pipe is provided with a first regenerated liquid valve; the first deionized water pipe is provided with a first deionized water valve; the spray apparatus is a spray ball or a spray discharge pipe; a second technical connecting pipe is arranged at the position on the barrel near the first closure; the second technical connecting pipe is provided with an overflow valve; and the second technical connecting pipe is connected with the reactor.

9. The filtering and concentrating apparatus according to claim 1, wherein the first closure is provided with a first technical connecting pipe; the first technical connecting pipe is respectively connected with an air intake pipe and an air relief pipe; the air intake pipe is provided with an air intake valve; and the air relief pipe is provided with an air relief valve.

10. The filtering and concentrating apparatus according to claim 1, wherein the stirring means comprises a stirring shaft; the stirring shaft is provided with one layer, two layers, three layers or four layers of stirring paddles; the lengths of the two layers, three layers or four layers of stirring paddles are the same; or the lengths of the two layers, three layers or four layers of stirring paddles are decreased from the direction of the second closure to the first closure.

11. The filtering and concentrating apparatus according to claim 10, wherein the two discharge pipes are a first discharge pipe and a second discharge pipe respectively; the microporous filtering medium at the first discharge pipe is a first microporous filtering medium, and the microporous filtering medium at the second discharge pipe is a second microporous filtering medium; and the three layers of stirring paddles are respectively located above the first microporous filtering medium, above the second microporous filtering medium and below the second microporous filtering medium.

12. The filtering and concentrating apparatus according to claim 6, wherein the barrel or the second closure is provided with a third technical connecting pipe; the third technical connecting pipe is provided with a second regulating valve; and the third technical connecting pipe is connected with the reactor.

13. The filtering and concentrating apparatus according to claim 6, wherein a feed pipe is connected at the feed port; a pneumatic ball valve is arranged at the position on the feed pipe near the feed port; the pneumatic ball valve is connected with a remote feed flowmeter, a damper, a check valve, a hose, a diaphragm pump and a feed valve successively; the feed pipe is connected with the reactor through the pipeline; the pipeline between the feed pipe and the reactor is provided with a thickened pulp return valve; the feed pipe is connected with the regeneration tank through the pipeline; the pipeline between the feed pipe and the regeneration tank is provided with a second regenerated material valve; the pipeline between the diaphragm pump and the feed valve is provided with a second regenerated liquid pipe and a second deionized water pipe in parallel; the second regenerated liquid pipe is provided with a second regenerated liquid valve; and the second deionized water pipe is provided with a second deionized water valve.

* * * * *